(12) United States Patent
Nuno et al.

(10) Patent No.: US 10,996,048 B2
(45) Date of Patent: May 4, 2021

(54) IMAGE AREA EXTRACTING METHOD, IMAGE AREA EXTRACTING PROGRAM, IMAGE AREA EXTRACTING SYSTEM, AND IMAGE AREA EXTRACTING DEVICE

(71) Applicant: 3M INNOVATIVE PROPERTIES COMPANY, St. Paul, MN (US)

(72) Inventors: Kazuma Nuno, Sagamihara (JP); Yukio Nojiri, Tama (JP)

(73) Assignee: 3M INNOVATIVE PROPERTIES COMPANY, St. Paul, MN (US)

(*) Notice: Subject to any disclaimer, the term of this patent is extended or adjusted under 35 U.S.C. 154(b) by 98 days.

(21) Appl. No.: 16/480,688

(22) PCT Filed: Jan. 16, 2018

(86) PCT No.: PCT/US2018/013842
§ 371 (c)(1),
(2) Date: Jul. 25, 2019

(87) PCT Pub. No.: WO2018/144213
PCT Pub. Date: Aug. 9, 2018

(65) Prior Publication Data
US 2019/0383600 A1 Dec. 19, 2019

(30) Foreign Application Priority Data
Jan. 31, 2017 (JP) .............................. JP2017-015975

(51) Int. Cl.
*G01B 11/16* (2006.01)
*G01B 11/25* (2006.01)
*G06T 7/00* (2017.01)

(52) U.S. Cl.
CPC .......... *G01B 11/165* (2013.01); *G01B 11/254* (2013.01); *G01B 11/2513* (2013.01); *G01B 11/2527* (2013.01); *G06T 7/001* (2013.01)

(58) Field of Classification Search
CPC .............. G01B 11/165; G01B 11/2513; G01B 11/2527; G01B 11/254; G06T 7/001
(Continued)

(56) References Cited

U.S. PATENT DOCUMENTS

| 5,724,439 | A | 3/1998 | Mizuoka |
| 2013/0009971 | A1 | 1/2013 | Maruyama |
| 2018/0356211 | A1 | 12/2018 | Otsuka |

FOREIGN PATENT DOCUMENTS

| JP | 10082614 | 3/1998 |
| JP | 2003179739 | 11/2006 |

(Continued)

OTHER PUBLICATIONS

International Search Report for PCT International Application No. PCT/US2018/013842, dated Jun. 26, 2018, 4 pages.

*Primary Examiner* — Tri T Ton
(74) *Attorney, Agent, or Firm* — Sriram Srinivasan

(57) ABSTRACT

Problem: To extract an image including a desired area included in a moire area from an image in which a sheet that includes the moire area has been imaged. An image area extracting device 1 extracts an image area from an image in which a sheet has been imaged provided with a first layer section having a first pattern including a plurality of drawn lines extending in a first direction, a second layer section overlapping the first layer section and including a plurality of drawn lines extending in a second direction that is different from the first direction, and a low adhesion section where adhesive force is lower than that of an adhesive section and an adhesion section arranged on an adhesive surface opposite a surface facing the first layer section and the second layer section. At this time, the image area extracting device 1 executes processing that includes acquiring sheet image data showing a sheet image including a sheet imaged so as to include a moire area where a moire is
(Continued)

created by overlaying the first pattern and the second pattern is acquired, extracting the moire area from the sheet image, extracting a non-fixing area where the low adhesion section is arranged based on a size of a fixing area where the adhesion section is arranged, and outputting non-fixing area image data showing a non-fixing area image including the non-fixing area.

12 Claims, 19 Drawing Sheets

(58) Field of Classification Search
USPC .................................................. 356/32–38
See application file for complete search history.

(56) References Cited

FOREIGN PATENT DOCUMENTS

| | | |
|---|---|---|
| JP | 2004229015 | 4/2007 |
| JP | 2009249485 | 10/2009 |
| JP | 2010271253 | 2/2010 |
| JP | 2006028224 | 10/2010 |
| JP | 2011191282 | 9/2011 |
| JP | 2009015515 | 10/2011 |
| JP | 2007241428 | 11/2011 |
| JP | 2012093260 | 5/2012 |
| JP | 2013222994 | 10/2013 |
| JP | 2011097519 | 5/2014 |
| WO | WO 2015-142779 | 9/2015 |
| WO | WO 2015-199957 | 12/2015 |
| WO | WO 2017-048610 | 3/2017 |
| WO | WO 2018-093655 | 5/2018 | ic
IMAGE AREA EXTRACTING METHOD, IMAGE AREA EXTRACTING PROGRAM, IMAGE AREA EXTRACTING SYSTEM, AND IMAGE AREA EXTRACTING DEVICE

CROSS REFERENCE TO RELATED APPLICATIONS

This application is a national stage filing under 35 U.S.C. 371 of PCT/US2018/013842, filed Jan. 16, 2018, which claims the benefit of JP Application No. 2017-015975, filed Jan. 31, 2017, the disclosure of which is incorporated by reference in its/their entirety herein.

TECHNICAL FIELD

The present disclosure relates to an image area extracting method, an image area extracting program, an image area extracting system, and an image area extracting device.

BACKGROUND

A variety of methods for detecting distortion, damage, and the like, in objects, such as buildings, and the like, have been proposed in the past. For example, deformation of a concrete wall of a structure in a building, or the like, can cause serious damage to the structure. Measurement using a distortion gauge or a ruler is conventionally known as a method for monitoring the advance of this kind or deformation. However, these methods are susceptible to measurement variations (that is, measurement errors) by measurers caused by measurement methods using distortion gauges or rulers, and thus do not adequately satisfy the requirement of accurately detecting deformations. Furthermore, measurements must be performed close to the objects measured. Therefore, there is demand for a method that is capable of accurate and simple deformation measurement without the need to be close to the object to be measured.

Patent Document 1, JP 2011-191282 A, provides a displacement measuring method that uses a moiré for measuring a minute relative displacement between two points using a moiré, where a lattice having spatially periodic structure is displayed on each of two plate like parts of a measuring device made from two plate like parts set so as to overlap one another following an object to be measured, and displacement in the object to be measured by reading an amount of movement of the moiré generated by optical interference between lattices.

Patent Document 2, JP H10-082614 A, provides a minute displacement measuring device for measuring a minute displacement in an observation point using a moiré, provided with imaging means for imaging a true lattice having a spatially periodic structure set in the observation point, conversion means for converting an image output of the imaging means to a digital signal and outputting true lattice image data, and image processing means for averaging separately created reference lattice image data with the true lattice image data output from the conversion means and outputting moiré image data.

Patent document 3, JP 2010-271253 A, provides a minute displacement display device attached directly or indirectly to an object to be measured, provided with a fixed side moiré slit plate to which a plurality of parallel lines have been applied, a vibration transmitting member attached directly or indirectly to an object to be measured, a transducer fixed to the vibration transmitting member, and a mobile side moiré slit plate, to which a plurality of parallel lines have been applied, fixed to the transducer, where a moiré is expressed by overlapping and arranging the fixed side moiré slit plate and the mobile side moiré slit plate so that the angles of the parallel lines differ, the mobile side moiré slit plate is slid by a displacement of the transducer caused by a vibration of the object to be measured through the vibration transmitting member, and a displacement amount of the moiré is displayed larger than a displacement amount of the transducer.

Patent Document 4, JP 2012-093260 A, provides a concrete crack sensor configured of a fiber containing plastic plate formed by impregnating a matrix resin into sheet like fibers, and an adhesive for adhering the fiber containing plastic sheet to a concrete surface, where the fiber containing plastic plate is adhered using the adhesive so as to straddle a crack in concrete to be measured so that a length of the crack can be detected based on a whitened part generated in conjunction with an increase in a width of the crack.

Patent Document 5, JP 2015-184043 A, discloses a sheet having a deformation following section having a first pattern, a non-deformation following section having a second pattern, and a deformation buffering section present between the deformation following section and the non-deformation following section, where the first pattern is visible through the second pattern.

A variety of techniques for extracting a specific area included in a captured image are also known.

Patent Document 6, JP 2007-241428 A, discloses dividing a captured image into a ruled line image including ruled lines and an information image representing information by specifying positions of the ruled lines in an image including text for showing a table including ruled lines and information included in the table.

Patent Document 7, JP 2003-179739 A, discloses extracting an effective image area included in an input image by labeling an image group, configuring an effective image area where input image data is the same, with the same label number, and extracting position information of a rectangle circumscribed around the image group.

Patent Document 8, JP 2009-015515 A, discloses quantifying a license plate likeness using characteristic data in a rectangle included in an image in which the license plate has been imaged, and selecting a license plate candidate rectangle based on results of comparing the quantified characteristic data to a threshold.

SUMMARY

Problem to be Solved

However, this is not a proposal for extracting an image including a desired area included in a moiré area, from an image taken of a sheet including a moiré area where a moiré is generated.

An object of the present disclosure is to resolve the aforementioned problem by providing an image area extracting method, an image area extracting program, an image area extracting system, and an image area extracting device capable of extracting an image including a desired area included in a moiré area from an image in which a sheet including the moiré area has been imaged.

Means for Solving the Problem

The image area extracting method according to the present disclosure extracts an image area from an image that has imaged a sheet including a first layer section having a first pattern including a plurality of drawn lines extending in a first direction, a second layer section having a second pattern overlapping the first layer section and including a plurality of drawn lines extending in a second direction that is different from the first direction, and a low adhesion section where adhesive force is lower than that of an adhesive section and an adhesion section arranged on an adhesive surface opposite a surface facing the first layer section and the second layer section, where a computer executes processing that includes acquiring sheet image data showing a sheet image in which a sheet has been imaged so as to include a moiré area where a moiré is generated, created by overlaying the first pattern and the second pattern, extracting the moiré area from the sheet image, extracting a non-fixing area where the low adhesion section is arranged based on a size of a fixing area where the adhesive section is arranged, and outputting non-fixing area image data showing a non-fixing area image including the non-fixing area.

It is preferable that, in the aforementioned image area extracting method, the fixing area include a first fixing area arranged on the adhesive surface and a second adhesion section arranged on the adhesive surface separated from the first fixing area, and that the extracting of the non-fixing area from the moiré area include extracting an area positioned between the first fixing area and the second fixing area as the non-fixing area.

It is preferable that, in the aforementioned image area extracting method, a planar shape of the fixing area be substantially rectangular, and that extracting the non-fixing area from the moiré area include the computer extracting the non-fixing area based on an aspect ratio of the fixing area.

Furthermore, the image area extracting program according to the present disclosure extracts an image area from an image in which a sheet has been imaged provided with a first layer section having a first pattern including a plurality of drawn lines extending in a first direction, a second layer section overlapping the first layer section and including a plurality of drawn lines extending in a second direction that is different from the first direction, and a low adhesion section where adhesive force is lower than that of an adhesive section and an adhesion section arranged on an adhesive surface opposite a surface facing the first layer section and the second layer section, where a computer executes processing that includes acquiring sheet image data showing a sheet image in which a sheet has been imaged so as to include a moiré area where a moiré is generated, created by overlaying the first pattern and the second pattern, extracting the moiré area from the sheet image, extracting a non-fixing area where the low adhesion section is arranged based on a size of a fixing area where the adhesive section is arranged, and outputting non-fixing area image data showing a non-fixing area image including the non-fixing area.

Moreover, the image area extracting device according to the present disclosure extracts an image area from an image in which a sheet has been imaged provided with a first layer section having a first pattern including a plurality of drawn lines extending in a first direction, a second layer section overlapping the first layer section and including a plurality of drawn lines extending in a second direction that is different from the first direction, and a low adhesion section where adhesive force is lower than that of an adhesive section and an adhesion section arranged on an adhesive surface opposite a surface facing the first layer section and the second layer section, and has a sheet image data acquiring unit for acquiring sheet image data showing a sheet image in which a sheet has been imaged so as to include a moiré area where a moiré is generated, created by overlapping the first pattern and the second pattern, a moiré area extracting unit for extracting the moiré area from the sheet image, an extensible area extracting unit for extracting a non-fixing area where the low adhesion area is arranged based on a size of a fixing area arranged by the adhesive section, and a fixing area outputting unit for outputting non-fixing area image data showing a non-fixing area image including the non-fixing area.

Furthermore, the image area extracting system according to the present disclosure extracts an image area from an image in which a sheet has been imaged provided with a first layer section having a first pattern including a plurality of drawn lines extending in a first direction, a second layer section overlapping the first layer section and including a plurality of drawn lines extending in a second direction that is different from the first direction, and a low adhesion section where adhesive force is lower than that of an adhesion section and an adhesive section arranged on an adhesive surface opposite a surface facing the first layer section and the second layer section, and has a sheet image data acquiring unit for acquiring sheet image data showing a sheet image in which a sheet has been imaged so as to include a moiré area where a moiré is generated, created by overlapping the first pattern and the second pattern, a moiré area extracting unit for extracting the moiré area from the sheet image, an extensible area extracting unit for extracting a non-fixing area where the low adhesion area is arranged based on a size of a fixing area arranged by the adhesive section, and a fixing area outputting unit for outputting non-fixing area image data showing a non-fixing area image including the non-fixing area.

Effect of the Solution

According to the present disclosure, an image including a desired area included in a moiré area can be extracted from an image in which a sheet that includes the moiré area has been imaged.

BRIEF DESCRIPTION OF THE DRAWINGS

FIG. 20A illustrates an example of a moiré area imaged when a sheet was affixed to a wall surface where a crack has developed, FIG. 20B illustrates an example of a moiré area imaged after a crack width has expanded, FIG. 20C illustrates an example of scanning in the frequency analysis method, and FIG. 20D illustrates an example of a determination of a non-fixing area in the frequency analysis method.

FIG. 21A illustrates an example of a moiré area imaged when a sheet was affixed to a wall surface where a crack has developed, FIG. 21B illustrates an example of a moiré area imaged after a crack width has expanded, FIG. 21C illustrates an example of a moiré area imaged when there was no change in the crack width, FIG. 21D illustrates a first sample sheet where a frequency analysis method non-fixing area cannot be determined with respect to the image area extraction method according to the present disclosure, which can determine a non-fixing area, and FIG. 21E illustrates a second sample sheet where a frequency analysis method non-fixing area cannot be determined with respect to the image area extraction method according to the present disclosure, which can determine a non-fixing area.

DETAILED DESCRIPTION

Embodiments of the present disclosure will be described below with reference to the drawings. However, it should be understood that the present disclosure is not intended to be limited to the drawings or to the embodiments described below.

While embodiments of the present disclosure are described below, the present disclosure is not limited to the following embodiments, and any modification that does not depart from the spirit and scope of the claims is intended to be included in the present disclosure.

Figure 1A:
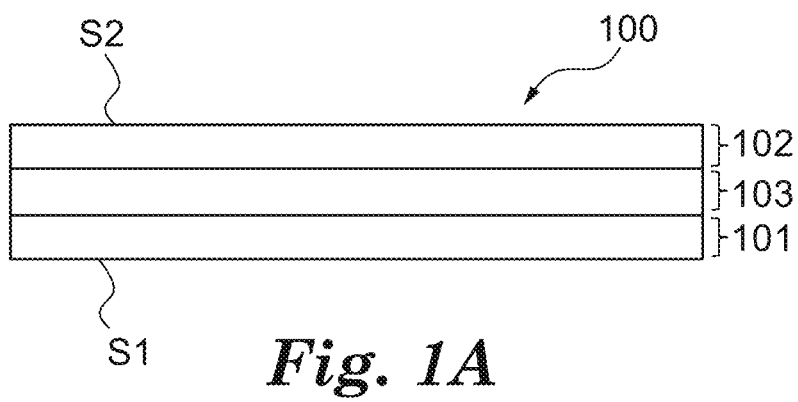
FIGS. 1A and 1B are illustrating examples of the sheet according to the present disclosure.
Figure 1B:
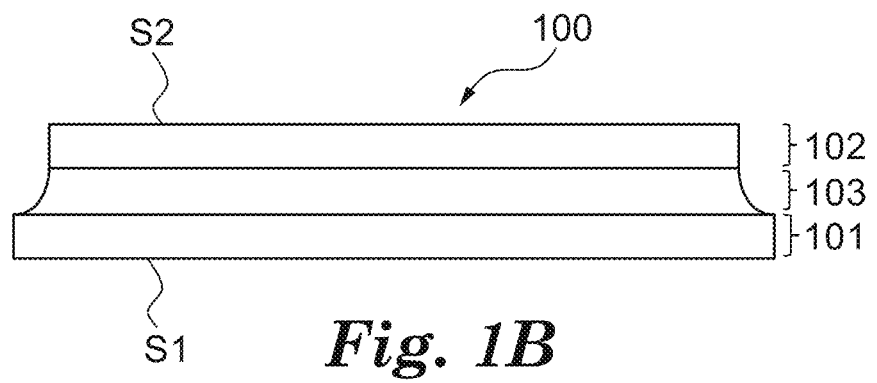

FIGS. 1A and 1B are illustrating examples of the sheet according to the present disclosure, where FIG. 1A illustrates a sheet in an non-deformed state prior to use and FIG. 1B illustrates a sheet in a deformed state during use. An embodiment according to the present disclosure provides a sheet 100 having a first main surface S1 and a second main surface S2 facing the first main surface S1. Below, the first main surface S1 is sometimes referred to as a front surface, and the second main surface S2 is referred to as an adhesion surface. The sheet 100 has a first section 101 having a first pattern (not illustrated in the figure), a second section 102 having a second pattern (not illustrated in the figure), and a third section 103 present between the first section 101 and the second section 102. In an embodiment, the first section 101 has larger extensibility than the second section 102. In the present disclosure "extensibility is large" means that, for example, a modulus of elasticity (Young's modulus) numerical value is small, a numerical value of elongation is large when pulled with the same force, and a numerical value of elongation up to breaking is large (not all of these numerical values need to be satisfied). In an embodiment, the first section 101 includes the first main surface S1 of the sheet 100, and the second section 102 includes the second main surface S2 of the sheet 100. In an embodiment, the first pattern is visible through the second pattern. In an embodiment, the sheet according to the present disclosure is configured so that a partial area of the first main surface S1 can be fixed to an object.

The first section 101 has the first pattern, and the second section 102 has the second pattern. The sheet 100 according to the present disclosure is configured so that moirés generated by the first pattern and the second pattern can be detected. More specifically, the first pattern is visible through the second pattern. Here, the first pattern being visible through the second pattern means that the first pattern can be visualized together with the second pattern when the sheet 100 is observed from the second main surface S2 side. Any visualization means can be selected, for example, pattern imaging can be exemplified under visual light using a variety of cameras. According to a configuration where the first pattern is visible through the second pattern, a moiré generated by interference between the first pattern and the second pattern is also visible. Therefore, according to the sheet according to the present disclosure, a deformation of an object can be evaluated simply, for example, the deformation can be evaluated from a distance without the need to get close to the object.

In a preferred embodiment in which the first pattern is visible through the second pattern, a portion of the sheet according to the present disclosure, from the first pattern to the sheet surface through the second pattern, is typically configured of a clear material. In the present disclosure a "clear material" means a material with a total light transmittance of at least 30%, and more preferably at least 80%, for light with a wavelength of 300 to 830 nm. The aforementioned total light transmittance is a value measured using an NDH2000 haze meter (manufactured by Nippon Denshoku Industries, Co., Ltd., Bunkyo-ku, Tokyo).

One main characteristic of the sheet according to the present disclosure is that the first pattern is distorted by the first section displacement, and that the second pattern having the second section is substantially unaffected by the distortion of the first pattern, that is, substantially does not distort. When the sheet is fixed to an object, displacement of the object can be detected through the distortion of the first pattern. Furthermore, the displacement generated in the object can be evaluated by detecting and evaluating a moiré generated by the distortion of the first pattern and the undistorted second pattern.

Because the first section 101 has larger extensibility than the second section 102, the first section 101 can function as a deformation following section (that is, a portion having the ability to displace following the displacement of the object when the object displaces in a state where the sheet is fixed to the object (as illustrated in FIG. 1B), and the second section 102 can function as a non-deformation following section (that is, a portion where displacement substantially does not follow the displacement when the first section displaces and that, accordingly substantially does not displace (as illustrated in FIG. 1B). In a typical embodiment, the third section 103 can function as a deformation buffering section (that is, a portion having adequate deformation buffering ability so that the second section 102 is substantially not displaced by the displacement of the first section 101 (as illustrated in FIG. 1B).

In an embodiment, the sheet according to the present disclosure is fixed to an object in a state where one area of the first main surface S1 (also referred to as a fixing area in the present disclosure) is fixed to the object, and the other area thereof (also referred to as a non-fixing area in the present disclosure) is not fixed to the object. In an embodiment, the fixing area is provided with sufficient adhesion so that the sheet adheres to an object (for example, a building when the sheet is used for building deformation evaluation) that acts as an adherend. On the other hand, there is no need to provide the non-fixing area with enough adhesion so as to be able to adhere to the object. That is, the first main surface of the sheet according to the present disclosure may be adhered to the object using substantially only the fixing area.

Figure 2A:
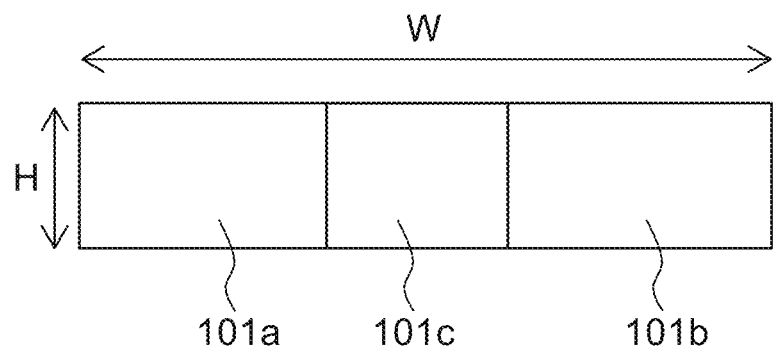
FIGS. 2A, 2B, and 2C are illustrating examples of fixing areas and non-fixing areas on a first main surface of the sheet according to the present disclosure.
Figure 2B:
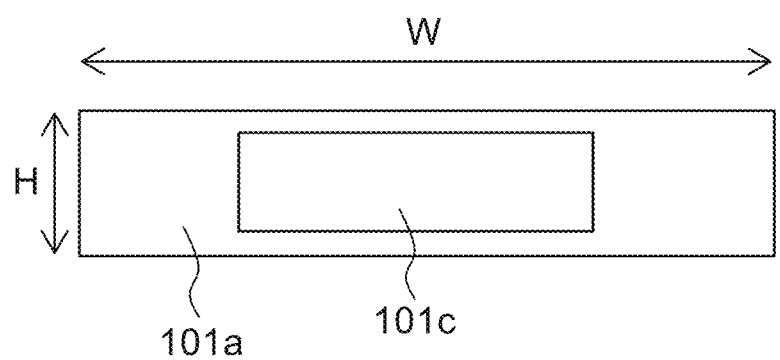
Figure 2C:
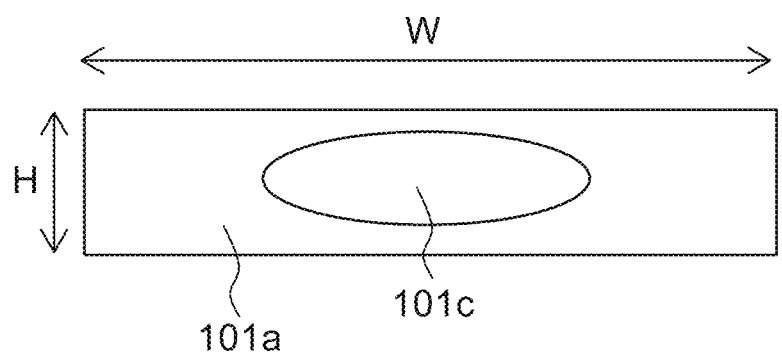

FIGS. 2A and 2B are illustrating examples of fixing areas and non-fixing areas in a first main surface of the sheet according to the present disclosure. FIG. 2A illustrates the arrangement of the fixing area and the non-fixing area in the sheet according to an embodiment, FIG. 2B illustrates the arrangement of the fixing area and the non-fixing area in the sheet according to a first modified embodiment, and FIG. 2C illustrates the arrangement of the fixing area and the non-fixing area in a second modified embodiment.

In the exemplified embodiments, an arrangement of a first fixing area 101a, a second fixing area 101b, and a non-fixing area 101c may be suitable to, for example, measurement (for example, measurement of linear damage or displacement when a crack width increases) of displacement when the first fixing area 101a and the second fixing area 101b, placed separated from one another so as to sandwich the rectangular non-fixing area 101c, which extends over an entire height H direction in a width W direction center portion of a first main surface like that illustrated in FIG. 2A, expand in the width H direction, but is not limited thereto. Furthermore, arrangements, such as the rectangular non-fixing area 101c arranged in a central portion of the width W direction and the height H direction and the surrounding fixing area 101a, as illustrated in FIG. 2B, as well as the elliptical non-fixing area 101c arranged in a central portion of the width W direction and the height H direction and the surrounding fixing area 101a, as illustrated in FIG. 2C, are suitable to measurement (for example, measurement of point-like damage or displacement when a crack expands radially) of displacement that expands radially in the width W and the height H directions.

Unless noted otherwise in the present disclosure, the first fixing area 101a is provided at one end of the sheet 100, the second fixing area 101b is provided at the other end of the sheet 100, and the non-fixing area 101c is provided between the first fixing area 101a and the second fixing area 101b, as illustrated in FIG. 2A.

Figure 3:
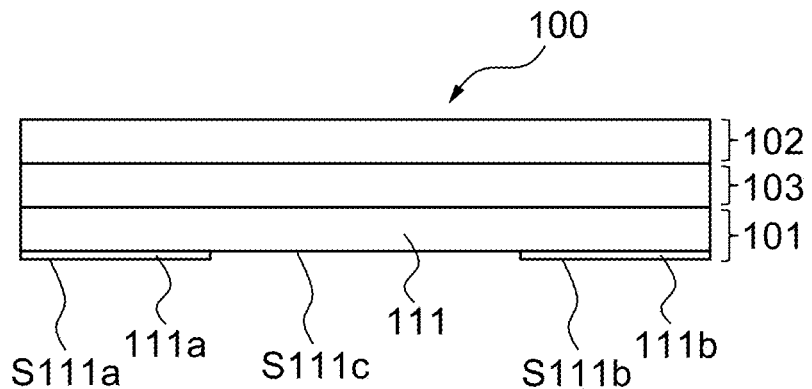
FIG. 3 is a drawing illustrating an example of the sheet according to the present disclosure.
Figure 4:
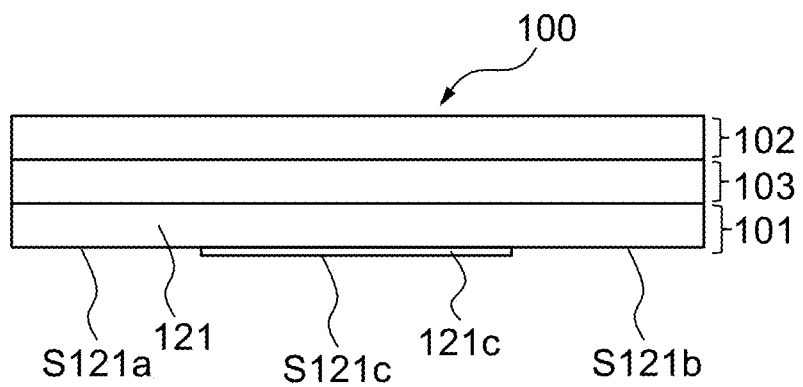
FIG. 4 is a drawing illustrating another example of the sheet according to the present disclosure.
Figure 5:
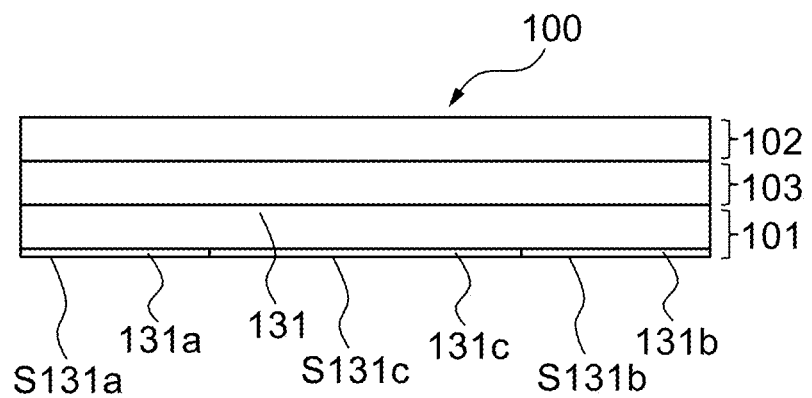
FIG. 5 is a drawing illustrating yet another example of the sheet according to the present disclosure.

FIG. 3 to FIG. 5 are diagrams that illustrate examples of the sheet according to the present disclosure. In an embodiment, combinations of the first fixing area 101a, the second fixing area 101b, and the non-fixing area 101c include a combination of high adhesion surfaces S111a and S111b and a low adhesion surface S111c, a combination of high adhesion surfaces S121a and S121b and a low adhesion surface 121c, and a combination of high adhesion surfaces S131a and S131b and a low adhesion surface S131c, and the like. In these embodiments, the first main surface S1 of the sheet 100 is configured of a high adhesion surface and a low adhesion surface. In the present disclosure, a "high adhesion surface" means that adhesive force is stronger than a "low adhesion surface" when the sheet is affixed to an adherend. Strong adhesive force means that, for example, peel force (90° peel, and the like), shear force, and holding force values are high (it is not necessary for all values to be high). The "low adhesion surface" may be a so-called surface with substantially no adhesive force. Note that FIG. 3 through 5 exemplify cases where the first fixing area 101a, the second fixing area 101b, and the non-fixing area 101c are arranged as illustrated in FIG. 2A.

In an embodiment, as illustrated in FIG. 3, the high adhesion surfaces S111a and S111b are provided by a high adhesion section (as a first adhesion section 111a, and a second adhesion section 111b arranged by being separated from the first adhesion section 111a) arranged on a low adhesive main body 111 of a first section 101, and the low adhesion surface S111c is provided by a portion where the main body 111 is exposed.

In another embodiment of FIG. 3, as illustrated in FIG. 4, the high adhesion surfaces S121a and S121b are provided by a portion where the high adhesive main body 121 of the first section 101 is exposed, and the low adhesion surface S121c is provided by a low adhesion section 121c arranged on the main body 121.

In another embodiment of FIG. 3 and FIG. 4, as illustrated in FIG. 5, the high adhesion surfaces S131a and S131b are provided by a high adhesion section (as a first adhesion section 131a, and a second adhesion section 131b arranged by being separated from the first adhesion section 131a) arranged on a main body 131 (which may have high adhesion or low adhesion) of the first section 101, and the low adhesion surface S131c is provided by a low adhesion section 131c arranged on the main body 131.

The aforementioned low adhesive main body can be configured as, for example, a high extensibility layer using a material like that described below.

The aforementioned high adhesion section can be configured using a pressure sensitive adhesive, examples of which include single layer film type pressure sensitive adhesive films, double sided adhesive sheets having two pressure sensitive adhesive layers, and the like. The pressure sensitive adhesive can be formed as a coating film containing an adhesive polymer. A preferred adhesive contains a cross-linking agent for crosslinking an adhesive polymer with an adhesive polymer. In the present disclosure an adhesive polymer means a polymer that shows adhesiveness at normal temperature (approximately 25° C.). Examples of pressure sensitive adhesives include acrylic types, rubber type polyurethanes, epoxy types, and the like.

The aforementioned high adhesive main body can be configured using the aforementioned adhesive polymers.

The aforementioned low adhesion section may be configured using a material with substantially no adhesive force with respect to an adherend, which is a material like that described below, as a high extensibility layer, may be configured using a material for enhancing slipperiness with respect to an adherend like a fluorine type resin, may be the same material as the aforementioned high adhesion section, and may be a material where adhesive force is weaker than the high adhesion section.

The first section, second section, and third section of the sheet according to the present disclosure can be configured using a single layer or a plurality of layers. The first section, second section, and third section may be configured by giving the single layer appropriate thickness and physical properties. Furthermore, the first section, second section, and third section may be configured using a plurality of layers having mutually different materials, thicknesses, and the like. Furthermore, in yet another exemplary embodiment, the first section, second section, and third section can be configured of two layers; being a layer that functions as the first section and the second section and a layer the functions as the third section, or, of two layers; being a layer that functions as the first section, and a layer the functions as the second section and the third section. As has been described above, a layer configuration of the sheet can be designed at random under the condition that the configuration has a portion that functions as the first section, second section, and third section.

Any conventionally well-known pattern used to evaluate moiré caused displacements can be applied as the first pattern and the second pattern. Pattern image details, for example, pattern image shape type, pitch, and the like, can be appropriately selected based on a targeted amount of displacement, and the like. Examples of pattern image shapes include grids, staggered patterns, dots, pluralities of parallel straight lines, and the like. In an exemplary embodiment, the first and second patterns can be grids each having pitches of approximately 0.4 mm to approximately 0.8 mm. For example, there are many cases where it is desirable to detect displacements of, for example, about 0.1 to 2.0 mm in deformation evaluations of building walls, etc., which is a preferred application for the sheet according to the present disclosure. Examples of a shape and pitch of a pattern image appropriate for such an application include a pitch of approximately 0.3 mm to approximately 1.0 mm in a sheet approximately 100 mm long per side.

In a preferred embodiment, a displacement amount ratio of the second section with respect to 100% of the displacement amount of the first section can be approximately 30% or less, 20% or less, 10% or less, or approximately 0%. The aforementioned ratio may be satisfied at any arbitrary time until at least a part of the sheet is torn in the displacement measuring method described below. However, in a preferred embodiment, the aforementioned ratio is satisfied at all points in time until at least a part of the sheet is torn when, for example, a displacement is increased in a state where the first section is displaced 0 mm.

Additionally, in a preferred embodiment, the displacement shown by the second section is approximately 3 mm or less, approximately 2.0 mm or less, approximately 1.0 mm or less, or approximately 0 mm when the first section is displaced 10 mm.

Where the aforementioned displacements are measured using the following method or a method known by a person skilled in the art as being equivalent to this method.

Figure 6A:
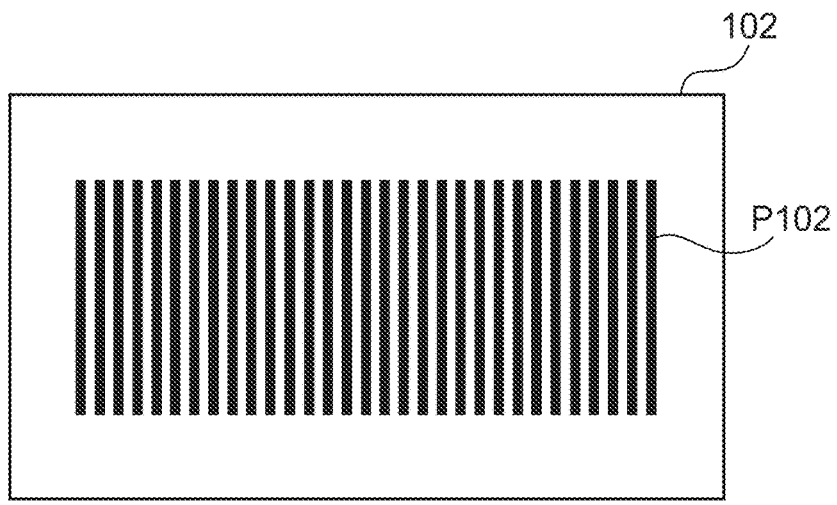
FIGS. 6A, 6B, and 6C are illustrating examples of the sheet according to the present disclosure, where (A) is a drawing for describing a second section when seen from a second main surface side, (B) is a drawing for describing the second section when seen from the second main surface side, and (C) is a drawing for describing the first section when seen from a first main surface side.
Figure 6B:
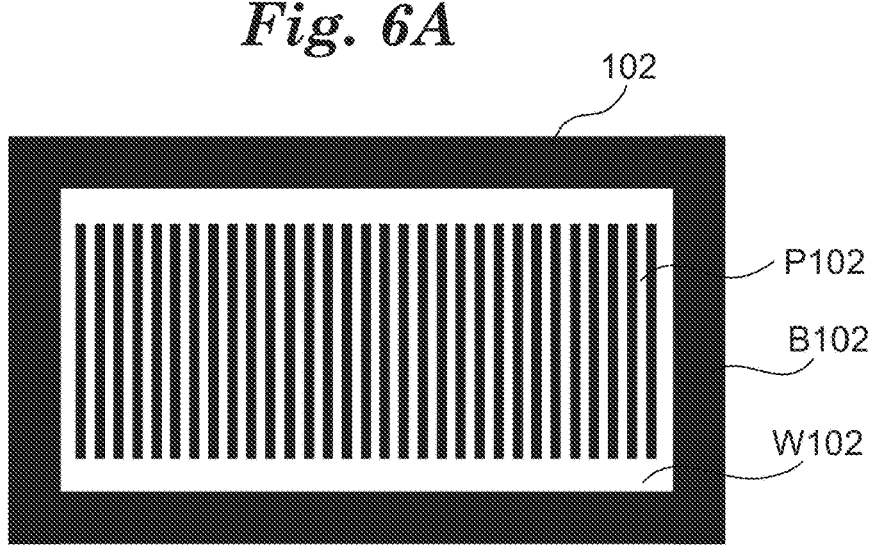
Figure 6C:
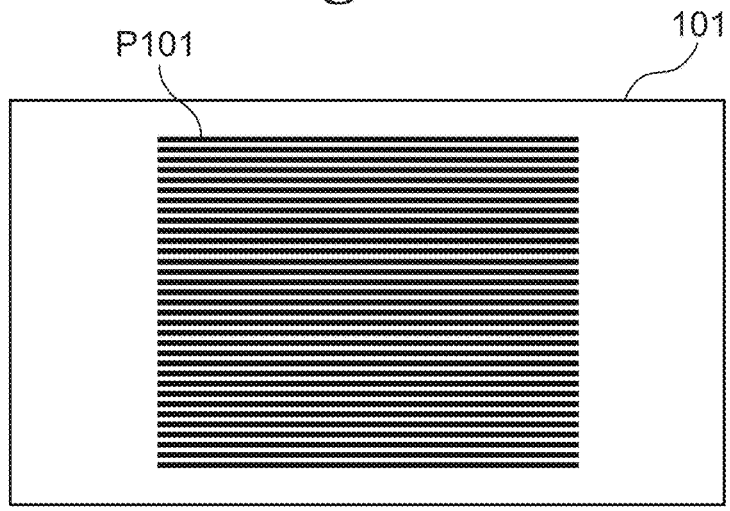

FIGS. 6A, 6B, and 6C are illustrating examples of the sheet according to the present disclosure. FIG. 6A is a drawing for describing a second section when seen from a second main surface side, FIG. 6B is a drawing for describing the second section when seen from the second main surface side, and FIG. 6C is a drawing for describing the first section when seen from a first main surface side.

A first pattern P101 is formed in the first section 101 by, for example, printing said pattern. In addition to a second pattern P102 being formed in the second section 102 by, for example, printing said pattern, a black area B102 can be formed through a white area W102 around the second pattern P102 by, for example, printing said area. A guard band formed by the white area W102 and the black area B102 is used when a moiré area where a moiré is generated by overlapping the first pattern P101 and the second pattern P102 is identified.

In an embodiment, the sheet also has a gauge for displaying a variety of line widths for measuring a width of an object displacement (a crack, and the like) by comparing said width to said gauge, a marker for displaying a mark for aligning the position of the sheet with respect to an object, and at least one mark for selecting a dimensional scale from a ruler. These marks may be arranged in the first section, second section, and third section of the sheet by, for example, printing the marks.

In a preferred embodiment, the first section includes a high extensibility layer having the first pattern. In a preferred embodiment, the second section includes a low extensibility layer having the second pattern. In a preferred embodiment, the third section includes a viscoelastic layer. In a preferred embodiment, the sheet is made from the high extensibility layer, low extensibility layer, and a viscoelastic layer.

In a typical embodiment, the high extensibility layer and the viscoelastic layer are bonded together through the adhesiveness of the high extensibility layer itself, the adhesiveness of the viscoelastic layer itself, a separate adhesive layer, or a combination of at least two of these. Additionally, in a typical embodiment, the viscoelastic layer and the low extensibility layer are bonded together through the adhesiveness of the viscoelastic layer itself, the adhesiveness of the low extensibility layer itself, a separate adhesive layer, or a combination of at least two of these.

<High Extensibility Layer>

The high extensibility layer can be configured using any material having enough extensibility to function as the first section. In a specific embodiment, the high extensibility layer is clear in consideration of making the pattern image visible. In a preferred embodiment, the high extensibility layer includes at least one type of polymer selected from a group consisting of polystyrenes, polyolefins, olefin copolymers, vinyl copolymers, (meth)acrylic polymers, (meth)acrylic copolymers, and polyurethanes. Note that in the present disclosure, "(meth)acrylic" means acrylic or methacrylic.

In a preferred embodiment, the high extensibility layer contains an (A):(B) mass ratio between a carboxyl group-containing (meth)acrylic copolymer (A) and an amino group-containing (meth)acrylic copolymer (B) of approximately 10:90 to approximately 90:10. In this case, the high extensibility layer can have excellent weather resistance and followability to an adherend.

In a preferred embodiment, the carboxyl group-containing (meth)acrylic copolymer (A) can be obtained by copolymerizing a composition containing a monoethylenically unsaturated monomer, which is a main component, and an unsaturated monomer containing a carboxyl group.

In a preferred embodiment, the amino group-containing (meth)acrylic copolymer (B) can be obtained by copolymerizing a composition containing a monoethylenically unsaturated monomer, which is a main component, and an unsaturated monomer containing an amino group.

It is preferable that the carboxyl group-containing (meth) acrylic copolymer (A) and the amino group-containing (meth)acrylic copolymer (B) be copolymerized through radical polymerization. In this case, a known polymerization method, such as solution polymerization, suspension polymerization, emulsion polymerization, bulk polymerization, and the like, can be used. Organic peroxides, such as benzoyl peroxide, lauroyl peroxide, bis(4-tert-butylcyclohexyl) peroxydicarbonate, and azo type polymerization initiators, such as 2,2'-azobisisobutyronitrile, 2,2'-azobis 2-methylbutyronitrile, 4,4'-azobis-4-cyanovaleric acid, 2,2'-azobis (2-methylpropionic acid) dimethyl, azobis 2,4-dimethylvaleronitrile (AVN), and the like, can be used as an initiator. It is best that the amount of the initiator used be approximately 0.05 parts by mass to approximately 5 parts by mass for every 100 parts by mass of a monomer mixture.

In the high extensibility layer, it is preferable that a Tg of either the carboxyl group-containing (meth)acrylic copolymer (A) or the amino group-containing (meth)acrylic copolymer (B) be 0° C. or more, while a Tg of the other be 0° C. or less. This is because the (meth)acrylic copolymer having the higher Tg gives the high extensibility layer high tensile strength, while the (meth)acrylic copolymer having the lower Tg improves the extensibility of the high extensibility layer.

In a preferred embodiment, the carboxyl group-containing (meth)acrylic copolymer (A) and the amino group-containing (meth)acrylic copolymer (B) each have a weight average molecular weight of approximately 10,000 or more, approximately 50,000 or more, approximately 100,000 or more, approximately 10,000,000 or less, or approximately 1,000,000 or less.

In a preferred embodiment, examples of the aforementioned monoethylenically unsaturated monomer include monomers represented by the general formula CH2=CR1COOR2 (where, in the formula, R1 is hydrogen or a methyl group, R2 is a straight chain or branched alkyl group, phenyl group, alkoxyalkyl group, or phenoxyalkyl group), aromatic vinyl monomers, such as styrene, α-methylstyrene, vinyltoluene, and the like, and vinyl esters, such as vinyl acetate, and the like. Examples of such monomers include phenoxyalkyl (meth)acrylates, such as methyl (meth)acrylate, ethyl (meth)acrylate, n-butyl (meth)acrylate, isoamyl (meth)acrylate, n-hexyl (meth)acrylate, 2-ethylhexyl (meth)acrylate, isooctyl (meth)acrylate, isononyl (meth) acrylate, decyl (meth)acrylate, dodecyl (meth) acrylate, phenoxyethyl (meth)acrylate, and the like, methoxypropyl (meth)acrylates, and alkoxyalkyl (meth)acrylates, such as 2-methoxybutyl (meth)acrylate, and the like. One type, or two or more types of monoethylenically unsaturated monomer can be used to obtain a desired glass-transition temperature, tensile strength, and elongation characteristics corresponding to the purpose thereof.

For example, by copolymerizing a (meth)acrylic monomer, such as methyl methacrylate (MMA), n-butyl methacrylate (BMA), and the like, having a Tg of 0° C. or more when homopolymerized as a single substance, as a main component, a (meth)acrylic copolymer having Tg of 0° C. or more can easily be obtained.

Furthermore, by copolymerizing a component, such as ethyl acrylate (EA), n-butyl acrylate (BA), 2-ethylhexyl acrylate (2 EHA), and the like, having a Tg of 0° C. or less when homopolymerized as a single substance, as a main component, a (meth)acrylic copolymer having Tg of 0° C. or less can easily be obtained.

Here, the glass-transition temperatures (Tg) of the carboxyl group-containing (meth)acrylic copolymer (A) and the amino group-containing (meth)acrylic copolymer (B) are derived using an FOX formula (formula below) with each polymer having been copolymerized from n types of monomer.

$$1/Tg = X1/(Tg1+273.15) + X2/(Tg2+273.15) + \ldots + Xn/(Tgn+273.15)$$

(Tg1: glass transition point of component 1 homopolymer
Tg2: glass transition point of component 2 homopolymer
X1: monomer weight fraction of component 1 added during polymerization
X2: monomer weight fraction of component 2 added during polymerization
X1+X2+ . . . +Xn=1)

Examples of unsaturated monomers containing carboxyl groups that configure carboxyl group-containing (meth) acrylic copolymers when copolymerized with monoethylenically unsaturated monomers include acrylic acid, methacrylic acid, maleic acid, itaconic acid, ω-carboxypolycaprolactone monoacrylate, phthalic acid monohydroxyethyl (meth)acrylate, β-carboxyethyl acrylate, 2-(meth)acryloyloxyethyl succinic acid, 2-(meth)acryloyloxyethyl hexahydrophthalic acid, and the like.

It is preferable that the carboxyl group-containing (meth) acrylic copolymer be obtained by copolymerizing a monoethylenically unsaturated monomer as a main component (specifically, in the range of approximately 80 parts by mass to approximately 95.5 parts by mass) and an unsaturated monomer containing a carboxyl group in the range of approximately 0.5 parts by mass and approximately 20 parts by mass.

Examples of unsaturated monomers containing amino groups that configure amino group-containing (meth)acrylic copolymers when copolymerized with monoethylenically unsaturated monomers include dialkylaminoalkyl (meth) acrylates, such as N,N-dimethylaminoethyl acrylate (DMAEA), N,N-dimethylaminoethyl methacrylate (DMAEMA), and the like, dialkylaminoalkyl (meth)acrylamides, such as N,N-dimethylaminopropyl acrylamide (DMAPAA), N,N-dimethylaminopropyl methacrylamide, and the like, and monomers having tertiary amino groups represented by vinyl monomers having nitrogen-containing heterocycles, such as vinyl imidazole, and the like.

It is preferable that the amino group-containing (meth) acrylic copolymer be obtained by copolymerizing a monoethylenically unsaturated monomer as a main component (specifically, in the range of approximately 80 parts by mass to approximately 95.5 parts by mass) and an unsaturated monomer containing an amino group in the range of approximately 0.5 parts by mass and approximately 20 parts by mass.

After the carboxy group-containing (meth)acrylic copolymer and the amino group-containing (meth)acrylic copolymer have been polymerized separately as described above, the high extensibility layer can be formed using a standard film forming method. For example, the high extensibility layer can be formed by mixing a solution of these polymers, applying the solution on a liner peeling surface, and then drying and solidifying the solution. A standard coater, for example, a bar coater, knife coater, roll coater, die coater, or the like, can be used as an application device. A solidification operation similar to a drying operation in the case of a paint containing a volatile solvent or an operation for cooling a melted resin component is used. The high extensibility layer can also be formed using a melt extrusion molding method.

A high extensibility layer having a desired tensile strength and elongation characteristics can be obtained by changing a compounding ratio between the carboxy group-containing (meth)acrylic copolymer and the amino group-containing (meth)acrylic copolymer when the high extensibility layer is formed. Specifically, a compounding ratio between a polymer with a relatively high Tg and a polymer having a relatively low Tg involving the carboxy group-containing (meth)acrylic copolymer and the amino group-containing (meth)acrylic copolymer can be approximately 10:90 to approximately 90:10, approximately 20:80 to approximately 90:10, or approximately 30:70 to approximately 90:10. In a preferred embodiment, there is more of the copolymer having a relatively high Tg than there is of the copolymer having a relatively low Tg.

In a preferred embodiment, the high extensibility layer also contains a crosslinking agent having a functional group reactive with a carboxyl group (C) in addition to the aforementioned carboxy group-containing (meth)acrylic copolymer (A) and amino group-containing (meth)acrylic copolymer (B). The cross linking agent contributes to the cross linking of the carboxy group-containing (meth)acrylic copolymer (A) and the amino group-containing (meth)acrylic copolymer (B). This kind of crosslinking forms a mesh structure, which further enhances the elongation characteristics in the high extensibility layer. Advantageously, the crosslinking agent has a functional group that can react with carboxyl groups and, specifically, a bisamide crosslinking agent (for example, RD1054, manufactured by 3M), an aziridine type crosslinking agent (for example, Chemitite PZ33, manufactured by Nippon Shokubai Co., Ltd., and NeoCryl CX-100, manufactured by Avecia), a carbodiimide type crosslinking agent (for example, Carbonlite V-03, V-05, and V-07, manufactured by Nisshinbo), an epoxy type crosslinking agent (for example, E-AX, E-5XM, and E5C, manufactured by Soken Chemical & Engineering Co., Ltd.), or the like, can be used. The amount of the crosslinking agent used is approximately 0.1 to approximately 5 parts by mass with respect to every 100 parts by mass of the carboxy group-containing (meth)acrylic copolymer (A).

The high extensibility layer may also contain at least one type of a variety of additives as desired. Antioxidants, ultraviolet light absorbers, light stabilizers, plasticizers, lubricants, antistatic agents, flame retardants, fillers, and the like, are exemplary additives.

In a preferred embodiment, the high extensibility layer has the strength not to break in response to, for example, a displacement of around several millimeters. From this perspective, it is preferable that the high extensibility layer have tensile strength of approximately 100 Mpa or less. Also from this perspective, a thickness of the high extensibility layer may be approximately 10 µm to approximately 150 µm, or approximately 30 µm to approximately 100 µm.

In a preferred embodiment, the high extensibility layer has first and second main surfaces, and a first pattern on the first main surface. The first pattern is, for example, a printed layer. For example, a high extensibility layer having a printed layer can be formed using, for example, a method that prints a desired pattern directly onto a front surface of an extensible film formed from a polymer like those described above, a method that transfers a printed layer having a desired pattern formed on a supporting body onto said extensible film, and the like. Printing can be performed by inkjet, gravure, letterpress, flexo, screen, electrostatic copying, sublimation heat transfer, and the like. In an exemplary embodiment, the high extensibility layer and the viscoelastic layer are fixed together so that the first main surface faces the viscoelastic layer. In this case, the first pattern is protected by the viscoelastic layer, which is advantageous because the pattern is thus not prone to being damaged. In a different exemplary embodiment, the second main surface may face the viscoelastic layer. In this case, the first pattern may be protected by a coated layer, and the like.

<Low Extensibility Layer>

A low extensibility layer has less extensibility than the high extensibility layer. The low extensibility layer can be configured using any material having enough low extensibility to function as the second section. The low extensibility layer is typically clear in consideration of making the pattern image visible.

In a preferred embodiment, the low extensibility layer includes at least one type of polymer selected from a group consisting of polyesters, polyolefins, and polyvinyls. Typically, the low extensibility layer can be a hard film. The hard film may be one available on the market, and examples of commercially available products include polyesters, polyolefins, polyvinyls, polystyrenes, polyacrylates, polymethacrylates, polyimides, polyurethanes, polyimides, polyamides, polysulfones, polyethers, polyacetals, polyphenylenes, polyepoxy resins, phenol resins, nylons, polycarbonates, and the like.

In a typical embodiment, the low extensibility layer may be exposed to the environment during use. Accordingly, it is preferable that the low extensibility layer have superior weather resistance. From this perspective, a polyester is a preferable as the low extensibility layer.

In a typical embodiment, the low extensibility layer is strong enough to substantially not displace when the high extensibility layer displaces. From this perspective, it is preferable that the low extensibility layer have tensile strength of approximately 50 MPa or more. Also from this perspective, a thickness of the low extensibility layer may be approximately 10 µm to approximately 150 µm, or approximately 50 µm to approximately 100 µm.

In a preferred embodiment, the low extensibility layer has first and second main surfaces, and a second pattern on the first main surface. The second pattern is, for example, a printed layer. For example, a low extensibility layer having a printed layer can be formed using, for example, a method that prints a desired pattern directly onto a front surface of a non-extensible film, a method that transfers a printed layer having a desired pattern formed on a supporting body onto said non-extensible film, and the like. Printing can be performed by inkjet, gravure, letterpress, flexo, screen, electrostatic copying, sublimation heat transfer, and the like. In an exemplary embodiment, the low extensibility layer and the viscoelastic layer are fixed together so that the first main surface faces the viscoelastic layer. In this case, the second pattern is protected by the viscoelastic layer, which is advantageous because the pattern is thus not prone to being damaged. In a different exemplary embodiment, the second main surface may face the viscoelastic layer. In this case, the second pattern may be protected by a coated layer, and the like.

<Viscoelastic Layer>

A viscoelastic layer has the ability to attenuate through an action that elastically deforms a position of a first section, and can be configured using any viscoelastic material having enough deformation buffering capacity to ensure that a second section substantially does not displace when the first section displaces. The viscoelastic layer is typically clear in consideration of making the pattern image visible.

In a preferred embodiment, the viscoelastic layer includes at least one type of polymer selected from a group consisting of polyolefins and olefin copolymers (hereinafter also referred to collectively as olefin (co) polymers), vinyl copolymers (for example, vinyl chloride polymers, and the like), (meth)acrylic polymers and (meth)acrylic copolymers (hereinafter also referred to collectively as (meth)acrylic (co) polymers) (for example, copolymers of poly(meth) acrylate, acrylic acid, acrylamide, and the like), polyurethanes (for example, polyether urethanes, polyester urethanes, and the like), and silicone polymers (for example, methyl vinyl silicones, and the like). Furthermore, the viscoelastic layer may also be a rubber layer, where examples of rubbers include butane type rubbers, butyl type rubbers, and the like.

Examples of raw material monomers of (meth)acrylic (co)polymers include (meth)acrylic monomers having straight chain or branched alkyl groups having 14 to 22 carbon atoms (hereinafter also referred to as C14-22 (meth) acrylic monomers), for example, isostearyl (meth)acrylates, cetyl (meth)acrylates, n-stearyl (meth)acrylates, n-behenyl (meth)acrylates, isomyristyl (meth)acrylates, isopalmityl (meth)acrylates, and the like.

The raw material monomers may also include unsaturated monocarboxylic acids (for example, acrylic acids, methacrylic acids, and the like), unsaturated dicarboxylic acids (for example, maleic acids, itaconic acids, and the like), ω-carboxypolycaprolactone monoacrylate, phthalic acid monohydroxyetyl (meth)acrylate, β-carboxyethyl acrylate, 2-(meth)acryloyloxyethyl succinic acid, or carboxyl group-containing monomers, such as 2-(meth)acryloyloxyethyl hexahydrophthalic acid, and the like.

For example, when the raw material monomer includes a C14-22 (meth)acrylic monomer and a carboxyl group-containing monomer, a formulation can be approximately 5 wt % to approximately 8 wt % of the carboxyl group-containing monomer with respect to approximately 92 wt % to 95 wt % of the C14-22 monomer. When the amount of the carboxyl group-containing monomer is approximately 5 wt % or more, a shear storage modulus of the viscoelastic layer G' is large, which is advantageous because cohesive force is good. Furthermore, a loss tangent tan δ is large, which is advantageous in terms of displacement buffering capacity. Meanwhile, it is advantageous that when the amount of the carboxyl group-containing monomer is approximately 8 wt % or less, the displacement buffering capacity has only a small amount of temperature dependency.

Examples of olefin (co) polymers include saturated polyolefins, that is, polyolefins having substantially no carbon double or triple bonds. For example, of the carbon bonds included in the saturated polyolefin, it is preferable that 90% or more of said bonds be single bonds. Examples of saturated polyolefins include polyethylenes, polybutenes, polypropylenes, polyisobutylenes, poly α-olefins, ethylene propylene copolymers, ethylene.α-olefin copolymers, propylene.α-olefin copolymers, hydrogenated polybutadienes, and the like. These may be used alone or two or more types may be used in combination.

Non-crystalline polymers can be used in the saturated polyolefin. Non-crystalline polymer is intended to mean either a polymer with an extremely small degree of crystallinity or a polymer that cannot be crystallized. While glass-transition temperatures can are measured with non-crystalline polymers, melting points are not measured. When a non-crystalline polymer is used, the shear storage modulus G' at 0° C. to 40° C. in the viscoelastic layer is adjusted to, for example, 1.5×104 to 5.0×106 pascals (Pa), so that good deformation buffering capacity can be obtained, and so that the viscoelastic layer and the other layers can be adhered satisfactorily.

A block copolymer (hereinafter referred to as a block copolymer) including a saturated polyolefin block and an aromatic vinyl monomer block can be used, and this block copolymer includes a block made from a polyolefin having substantially no double or triple carbon bonds and a block made from an aromatic vinyl monomer. For example, of the carbon bonds included in the saturated polyolefin, it is preferable that 90% or more of said bonds be single bonds. Examples of aromatic vinyl monomers include styrenes, p-methyl styrenes, a-methyl styrenes, indene, and the like. These may be used alone or two or more types may be used in combination. Examples of block copolymers include styrene-ethylene-propylene-styrene block copolymers, styrene-ethylene-propylene block copolymers, styrene-ethylene-butylene-styrene block copolymers, and the like.

Non-crystalline saturated polyolefin blocks can be used. When a non-crystalline block is used, the shear storage modulus G' at 0° C. to 40° C. in the viscoelastic layer is adjusted to, for example, approximately 1.5×104 to approximately 5.0×106 pascals (Pa), so that good deformation buffering capacity can be obtained, and so that the viscoelastic layer and the other members can be adhered satisfactorily.

A compounding ratio of the saturated polyolefin and/or the block copolymer can be approximately 2 parts by mass to approximately 40 parts by mass with respect to 100 parts by mass of a (meth)acrylic (co)monomer. When the ratio is approximately 2 parts by mass or more, a viscoelastic layer with a small degree of temperature dependency can be obtained, and, when the ratio is approximately 40 parts by mass or less, the weather resistance will be favorable, and there will be advantages for reliability during long term use and adhesion to other members.

The weight average molecular weight of the (meth)acrylic (co)polymer can be in the range of approximately 10,000 to approximately 2,000,000. The aforementioned range is advantageous in terms of obtaining a viscoelastic layer with a high elastic modulus and that is advantageous for reliability during long term use.

In addition to polymers like the ones described above, the viscoelastic layer may also include tackifying resins, including, for example, rosin resins, modified rosin resins (hydrogenated rosin resins, dis-proportionated rosin resins, polymerized rosin resins, and the like), terpene resins, terpene phenolic resins, aromatic modified terpene resins, C5 and C9 type petroleum resins, coumarone resins, and the like. The layer may also include commonly used additives, such as thickeners, thixotropic agents, bulking agents, fillers, and the like.

More detailed examples of viscoelastic materials that can be used in the viscoelastic layer are disclosed in, for example, JP 2009-249485, JP 2006-28224, and the like.

When the viscoelastic layer is too thin, the low extensibility layer can also deform in conjunction with the deformation of the high extensibility layer, meanwhile, if the viscoelastic layer is too thick, the first pattern and the second pattern can shift based on an observation angle, which can, accordingly, lead to a drop in the visibility of the moiré. In a preferred embodiment, the thickness of the viscoelastic layer is approximately 100 μm to approximately 1.5 mm, or approximately 500 μm to approximately 1.0 mm.

<Sheet Characteristics>

In a preferred embodiment, when the sheet is subjected to a tensile test, the high extensibility layer exhibits tensile strength of 0.5 MPa or more and 100 MPa or less, and elongation of 3% or more and 200% or less. In a preferred embodiment, when the sheet is subjected to a tensile test, the low extensibility layer exhibits tensile strength of 50 MPa or more and 350 MPa or less, and elongation of 1% or more and 200% or less. In a preferred embodiment, when the sheet is subjected to a tensile test, the viscoelastic layer exhibits tensile strength of 0.01 MPa or more and 100 MPa or less, and elongation of 10% or more and 3000% or less.

Tensile strength and elongation are measured under the following conditions in accordance with the method set forth in JIS K6251 (2010 Edition, ISO 37).

Measurement sample shape: "Dumbbell shape No. 3" disclosed in JIS K6251

Tensile speed: 300 mm/min

Measuring speed: 23±1° C.

Tensile strength T (units: MPa) is derived from the following formula after iron tensile strength F (units: N) up until each layer of the measurement sample breaks, and until cross sectional area A (units: mm$^2$) of each layer of the measurement sample have been measured.

$$T=F/A$$

Elongation E (units: %) is derived from the following formula after a gauge line distance L1 (units: mm) and a gauge line distance L0 (25 mm) have been measured when each layer in the measurement sample breaks.

$$E=(L1-L0)/L0\times100$$

Typically, when the sheet according to the present disclosure is subjected to the aforementioned tensile test, each of the layers break, and, in an exemplary embodiment, the low extensibility layer, viscoelastic layer, and high extensibility layer break, in that order. Accordingly, while contributions by other layers are included in the values measured using the aforementioned method as the tensile strength and elongation of the each layer, in the present disclosure, such measurement values are defined as the tensile strength and elongation of each layer in the sheet.

In a preferred embodiment, when just the high extensibility layer of the sheet is pulled in a sheet in-plane direction, the high extensibility layer breaks before the low extensibility layer breaks. This can be confirmed by, in reference to FIG. 5, the fact that the high extensibility layer breaks before the low extensibility layer does.

Also, in a preferred embodiment, the elongation of the low extensibility layer is 0 to 35% of the elongation of the high extensibility layer at the time the high extensibility layer breaks as described above. This ratio can be assessed as the ratio between the elongation of the high extensibility layer and the elongation of the low extensibility layer at the time the high extensibility layer breaks. This kind of ratio contributes to an accurate assessment of an amount an object displaces due to a moiré.

In a preferred embodiment, the Young's modulus of the first section or the high extensibility layer is approximately 0.5 GPa or less, approximately 0.1 GPa or less, or approximately 0.05 GPa or less. Also, in a preferred embodiment, the Young's modulus of the second section or the low extensibility layer is approximately 0.1 GPa or more, approximately 1.5 GPa or more, or approximately 2.0 GPa or more. Note that the aforementioned Young's modulus values are values obtained by setting a sample cut to a width of 10 mm in a tensile tester with a chuck distance of 100 mm, pulling the sample in a vertical direction at a speed of 1 mmpm, and then, calculating the Young's modulus based on an S-S curve incline in a portion where distortion % has reached 0.05 to 0.25%.

An adhesive force with respect to a mortar board of approximately 1.0 N/cm$^2$ or more in a shear direction, in accordance with JIS K5600 (ISO 2409), is an example of a fixing area, that is, of preferred adhesive properties of a high adhesion surface. These kind of adhesive properties are advantageous in terms of the fact that said properties allow a sheet to be securely fixed to an object when the object is, for example, concrete, metal, and the like.

In a preferred embodiment, substantially all portions of the sheet according to the present disclosure are configured using clear materials, except the first and second patterns, the gauge, the marker, and the ruler.

In consideration of making a moiré easily visible, an area ratio (for example, a ratio B/A of an area B of a low adhesion surface with respect to an area A of a high adhesion surface) of a non-fixing area with respect to an area of the fixing area is preferably approximately 1% or more, or approximately 5% or more, and, in consideration of fixing well to an object, preferably approximately 500% or less, or approximately 300% or less.

In consideration of fixing well to an object, an area ratio (for example, a ratio D/C of an area D (for example, a total area of a first sticky section and a second sticky section) of a high adhesion section with respect to an area C of a first main surface) is preferably approximately 10% or more, or approximately 30% or more, and, in consideration of making a moiré easily visible, preferably approximately 99% or less, or approximately 95% or less.

Furthermore, in consideration of being able to perform spatial frequency analysis close to the same amount in both the x axis and y axis directions on a two-dimensional plane during assessment of displacement caused by a moiré, an aspect ratio of a low adhesion surface is approximately 0.5 to approximately 2.0, approximately 0.7 to approximately 1.3, or approximately 0.9 to approximate 1.1.

The size of the sheet according to the present disclosure can be appropriately designed in consideration of ease of sticking in accordance with damage to an adherend or an object to be measured. In an exemplary embodiment, and entire area (that is, a total area of the fixing area and the non-fixing area) of the first main surface is approximately 1 cm$^2$ to approximately 1,000 cm$^2$, or approximately 2 cm$^2$ to approximately 500 cm$^2$, and is thus appropriate for an application for measuring a crack in concrete in a building.

Note that while the sheet according to an embodiment of the present disclosure has the fixing area and the non-fixing area, the present disclosure also encompasses any sheet that is the same as the sheet according to the present disclosure described above except that substantially an entire surface of a first major surface thereof is the fixing area.

[Configuration and Function of the Image Area Extracting Device According to a First Embodiment]

Figure 7:
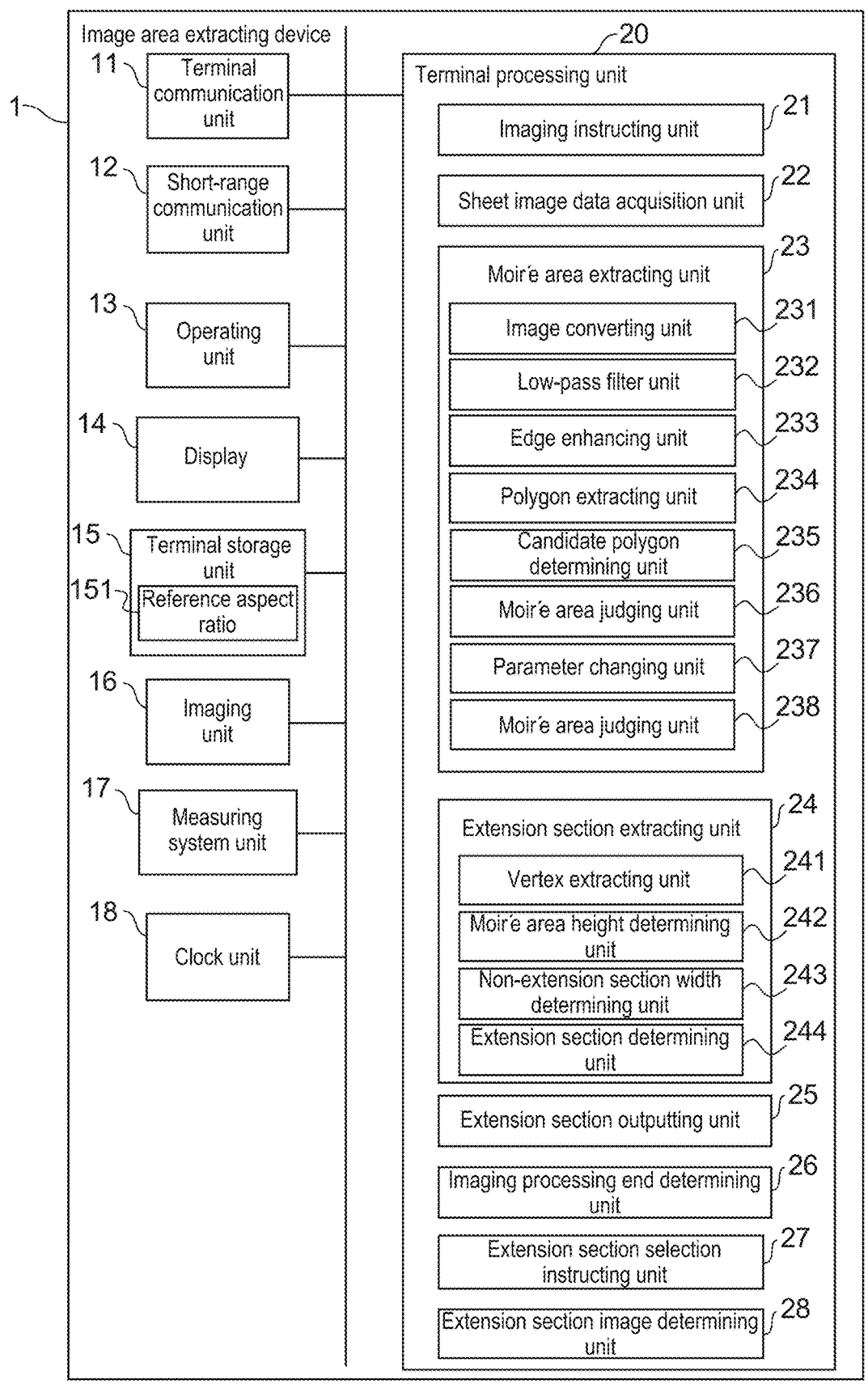
FIG. 7 is a drawing illustrating the schematic structure of the image area extracting device according to a first embodiment.

FIG. 7 is a drawing illustrating the schematic structure of the image area extracting device according to a first embodiment.

An image area extracting device 1 is, for example, a multifunction mobile phone (so-called "smart phone"), which makes it possible to connect to a wireless communication network, conduct short-range wireless communication, and execute a prescribed application program, and the like. Therefore, the image area extracting device 1 has a terminal communication unit 11, a short-range communication unit 12, an operating unit 13, a display 14, a terminal storage unit 15, an imaging unit 16, a measuring system unit 17, a clock unit 18, and a terminal processing unit 20. Note that the image area extracting device 1 need only be a communication device having a communication function and an imaging device, and thus may be a terminal device, such as, for example, a Personal Digital Assistant (PDA), a mobile gaming device, a mobile music player, a tablet PC, and the like.

The terminal communication unit 11 includes an antenna with a sensitive band mainly in the 2.1 GHz band, has a communication interface circuit, and connects the image area extracting device 1 to a communication network. The terminal communication unit 11 establishes a wireless communication circuit with a base station not illustrated in the figures through a channel assigned by the base station using the Code Division Multiple Access (CDMA) method, and then communicates with the base station. Furthermore, the terminal communication unit 11 supplies data received from the base station to the terminal processing unit 20. The terminal communication unit 11 also sends data supplied by the terminal processing unit 20 to the base station. Note that the terminal communication unit 11 performs data communication with a server not illustrated in the figures in accordance with a protocol, such as the Hyper Text Transfer Protocol (HTTP), and the like. Moreover, the terminal communication unit 11 includes an antenna with a sensitive band mainly in the 2.4 GHz band, has a communication interface circuit, and performs wireless communication through a wireless LAN base station, such as Wi-Fi (Registered Trademark), and the like, without going through the base station.

The short-range communication unit 12 has an interface circuit for performing short-range wireless communication in accordance with a communication method, such as Bluetooth LE (Low Energy) (Registered Trademark), and performs short-range wireless communication with other terminal devices, and the like. The short-range communication unit 12 also supplies data received from other terminal devices, and the like, to the terminal processing unit 20. Moreover, the short-range communication unit 12 sends data supplied by the terminal processing unit 20 to other terminal devices, and the like. Note that the short-range communication unit 12 may also have interface circuits for performing short-range wireless communication in accordance with other communication methods, such as Bluetooth (Registered Trademark), Radio Frequency Identification (RFID), ZigBee, and the like.

The operating unit 13 may be any device as long as the image area extracting device 1 can be operated, and thus may be, for example, a keypad, or the like. A user can use the device to input text, numbers, and the like. The operating unit 13 receives an instruction from the user, generates a signal corresponding to the received instruction, and outputs the signal to the terminal processing unit 20. Moreover, the operating unit 13 receives a user instruction through contact, such as tapping, dragging, flicking, and the like, generates a signal corresponding to the received instruction, and outputs the signal to the terminal processing unit 20.

The display 14 can be any device capable of outputting videos, static images, and the like. The display 14 displays a static image corresponding to video and static image data based on video data supplied by the terminal processing unit 20.

The terminal storage unit 15 has, for example, semiconductor memory. The terminal storage unit 15 stores data, and the like, such as a driver program, an operating system program, and an application program used in processing by the terminal processing unit 20. For example, the terminal storage unit 15 stores a mobile phone communication device driver program, or a wireless LAN communication device driver program for controlling the terminal communication unit 11 as a driver program. Moreover, the terminal storage unit 15 stores a short-range wireless communication device driver program for controlling the short-range communication unit 12, an input device driver program for controlling the operating unit 13, an output device driver program for controlling the display 14, and the like. The terminal storage unit 15 also stores a variety of application programs, including a web browser program for acquiring and displaying web images, an image area extracting program for executing image area extracting processing, and the like. A computer program can be installed on the terminal storage unit 15 using a known startup program from a computer readable portable recording medium, such as semiconductor memory, and the like, including, for example, flash memory.

Furthermore, the terminal storage unit 15 stores information and data used in image processing and image area extracting processing, as well as, data derived by image processing and image area extracting processing. Additionally, the terminal storage unit 15 may temporarily store temporary data relating to a prescribed process. In an embodiment, the terminal storage unit 15 stores a reference aspect ratio 151 used in image area extracting processing. The reference aspect ratio 151 includes a first reference aspect ratio $k_1$ (=W1/H) derived by dividing a width W1 of the first fixing area 101*a* by a height H of the first fixing area 101*a*, and a second reference aspect ratio $k_2$ (=W2/H) derived by dividing a width W2 of the second fixing area 101*b* by a height H of the second fixing area 101*b*.

The imaging unit 16 has an imaging element arranged in an array, and an element driving unit for driving the imaging element. The imaging element has a Charge Coupled Device (CCD) type sensor or an Active Pixel Sensor (APS) type sensor and a color filter, and accumulates a charge based on incident light. When light incidents onto the imaging element through the color filter, the element driving unit converts a charge accumulated by each imaging element into an electric signal, and outputs the signal to the terminal processing unit 20.

The measuring system unit 17 measures a position where the image area extracting device 1 is present in accordance with an instruction from the terminal processing unit 20. The measuring system unit 17 includes an antenna with a sensitive band mainly in the 1.5 GHz band, has a GPS circuit, and receives a GPS signal from a GPS satellite not illustrated in the figures. The measuring system unit 17 decodes the GPS signal to acquire time information, and the like. The measuring system unit 17 calculates a pseudo range from the GPS satellite to the measuring system unit 17 based on the time information, and the like, measures the position (latitude and longitude, and the like) where the image area extracting device 1 is present by solving a simultaneous equation obtained by substituting the pseudo range, and then outputs position information.

The clock unit 18 is configured of a clock circuit, and the like, counts the date and time, and generates date information and time information for updating each piece of information.

The terminal processing unit 20 has one or a plurality of processors and peripheral circuits thereof. The terminal processing unit 20 comprehensively controls all of the operations of the image area extracting device 1, and is, for example a Central Processing Unit (CPU). The terminal processing unit 20 controls the operations of the terminal communication unit 11 and the short-range communication unit 12, and the like, so that various processes of the image area extracting device 1 are executed in an appropriate order based on a program stored in the terminal storage unit 15 and an operation of the operating unit 13. The terminal processing unit 20 executes processing based on a program (driver program, operating system program, application program, and the like) stored in the terminal storage unit 15. Furthermore, the terminal processing unit 20 can execute a plurality of programs (application programs, and the like) in parallel.

The terminal processing unit 20 has an imaging instructing unit 21, a sheet image data acquisition unit 22, a moiré area extracting unit 23, a non-fixing area extracting unit 24, a non-fixing area output unit 25, an imaging processing end determining unit 26, a non-fixing area selection instructing unit 27, and a non-fixing area image determining unit 28. The moiré area extracting unit 23 has an image converting unit 231, a low-pass filter unit 232, an edge enhancing unit 233, a polygon extracting unit 234, a candidate polygon determining unit 235, a moiré area judging unit 236, a parameter changing unit 237, and a moiré area determining unit 238. The non-fixing area extracting unit 24 has a vertex extracting unit 241, a moiré area height determining unit 242, a fixing area width determining unit 243, and a non-fixing area determining unit 244. Each of these units in the terminal processing unit 20 are functional modules loaded by a program executed on a processor in the terminal processing unit 20. Or, each of these units in the terminal processing unit 20 may be mounted on the image area extracting device 1 as an independent integrated circuit, a microprocessor, or as firmware.

Figure 8:
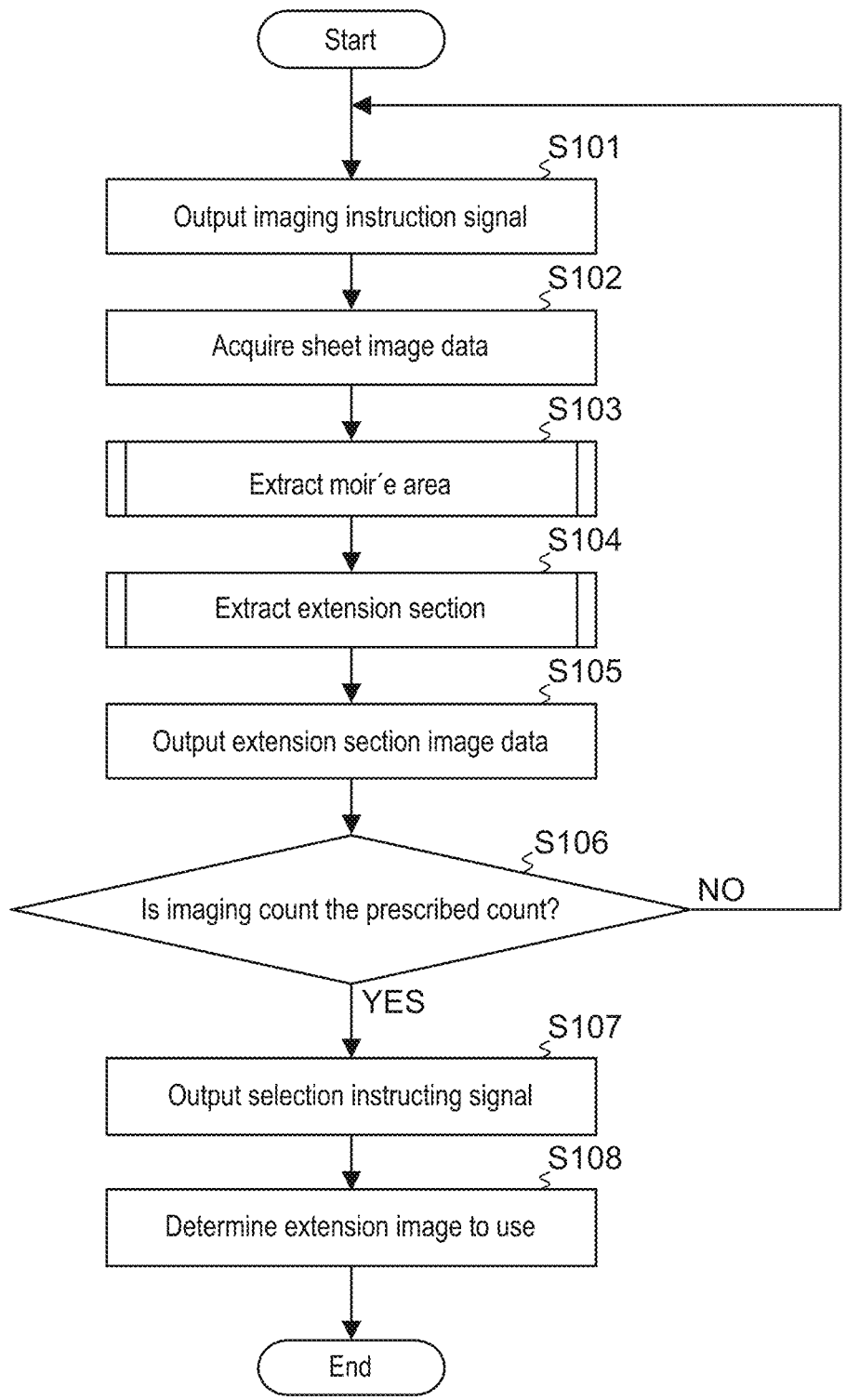
FIG. 8 is a flow chart illustrating an image area extracting process by the image area extracting device illustrated in FIG. 7.

[Image Area Extracting Processing by the Image Area Extracting Device According to the First]Embodiment FIG. 8 is a flow chart illustrating an image area extracting process by the image area extracting device 1.

First, the imaging instructing unit 21 outputs an imaging instructing signal to the display 14 showing imaging instructions for instructing imaging of a sheet to an operator not illustrated in the figures based on a startup process for an image area extracting program by the operator not illustrated in the figures (S101). In an embodiment, the imaging instruction includes the character string "Please image the sheet." When an imaging instructing signal is input, the display 14 displays a character string including an imaging instruction corresponding to the imaging instructing signal.

Next, the sheet image data acquisition unit 22 acquires sheet image data showing a sheet image including the sheet through the imaging unit 16 based on a sheet imaging operation by the operator not illustrated in the figures using the image area extracting device 1 (S102). The sheet image corresponding to the sheet image data is a color image captured so as to include a moiré area where a moiré is created by overlapping a first pattern P101 and a second pattern P102.

Next, the moiré area extracting unit 23 extracts the moiré area where a moiré is created by overlapping the first pattern P101 and the second pattern P102 from the sheet image corresponding to the sheet image data acquired by the process in S102 (S103).

Next, the non-fixing area extracting unit 24 extracts a non-fixing area in which a sticky section has not been arranged based on a size of a fixing area where a sticky section has been arranged from the moiré area extracted by the process in S103 (S104).

Next, the non-fixing area output unit 25 outputs to the display 14 non-fixing area image data showing a non-fixing area image including the non-fixing area extracted by the process in S104 along with display position information showing a display image displayed on the display 14 (S105). The display 14 displays a non-fixing area image corresponding to the non-fixing area image data in a display position corresponding to the display position information.

Next, the imaging processing end determining unit 26 determines whether an imaging count has reached a prescribed count (S106). If the imaging processing end determining unit 26 determines that the imaging count has not reached the prescribed count (S106—NO), the process returns to S101. Subsequently, the processing in S101 through S106 is repeated until the imaging processing end determining unit 26 determines that the imaging count has reached the prescribed count (S106—YES).

When the imaging processing end determining unit 26 determines that the imaging count has reached the prescribed count (S106—YES), the non-fixing area selection instructing unit 27 outputs a selection instructing signal indicating which non-fixing area image extracted from the sheet image imaged across the prescribe count to select (S107). In an embodiment, the imaging instruction includes the character string "Please select 1 image."

Figure 9:
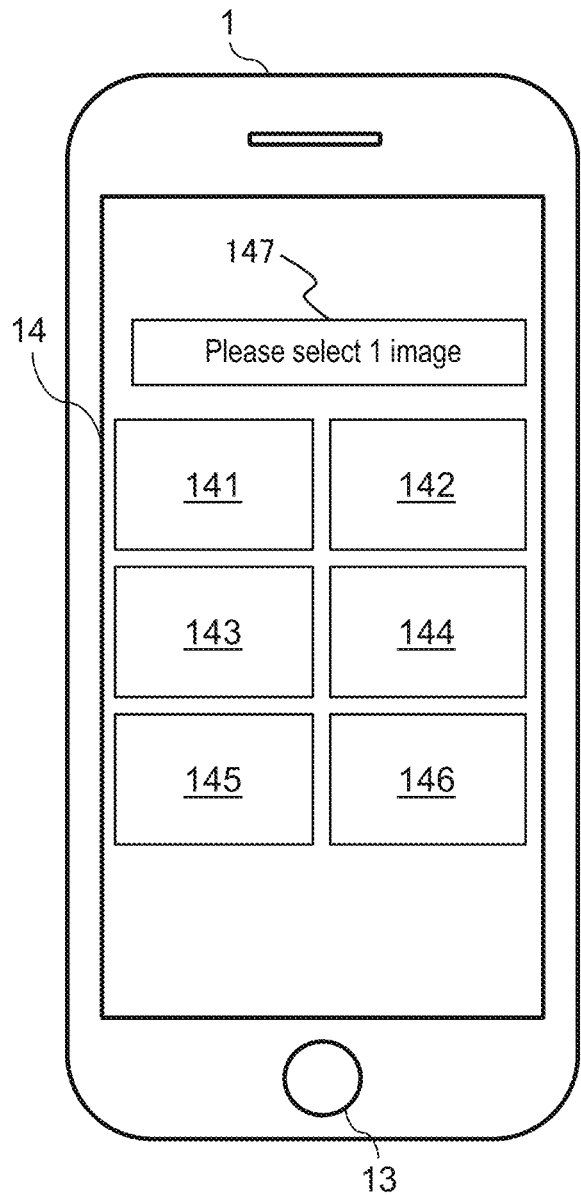
FIG. 9 is a drawing illustrating the image area extracting device illustrated in FIG. 7 displaying a prescribed number of non-fixing area images and imaging instructions.

FIG. 9 is a drawing illustrating the image area extracting device 1 displaying a prescribed number of non-fixing area images and imaging instructions. Six non-fixing area images are displayed in the example illustrated in FIG. 9.

Non-fixing area image 141 through non-fixing area 146 are selectably displayed on the display 14. Furthermore, an imaging instruction 147 including the character string "Please select 1 image" is displayed on the display 14 along with the non-fixing area image 141 through the non-fixing area image 146. The operator not illustrated in the figures selects one of the areas from among the non-fixing area image 141 through the non-fixing area image 146 by touching one of the displayed areas from among the non-fixing area image 141 through the non-fixing area image 146 of the display 14. The non-fixing area image determining unit 28 determines that the non-fixing area image selected by the operator not illustrated in the figures is the non-fixing area image to be used (S108).

The non-fixing area image selected by the non-fixing area image determining unit 28 is used in various processes executed by the terminal processing unit 20 based on an application program stored in the terminal storage unit 15. For example, when the sheet is affixed overlapping a crack that has occurred in a wall surface, the non-fixing area image is used in a crack width change amount estimating process for estimating crack width of a crack to which the sheet has been affixed based on a moiré change occurring in the non-fixing area.

Figure 10:
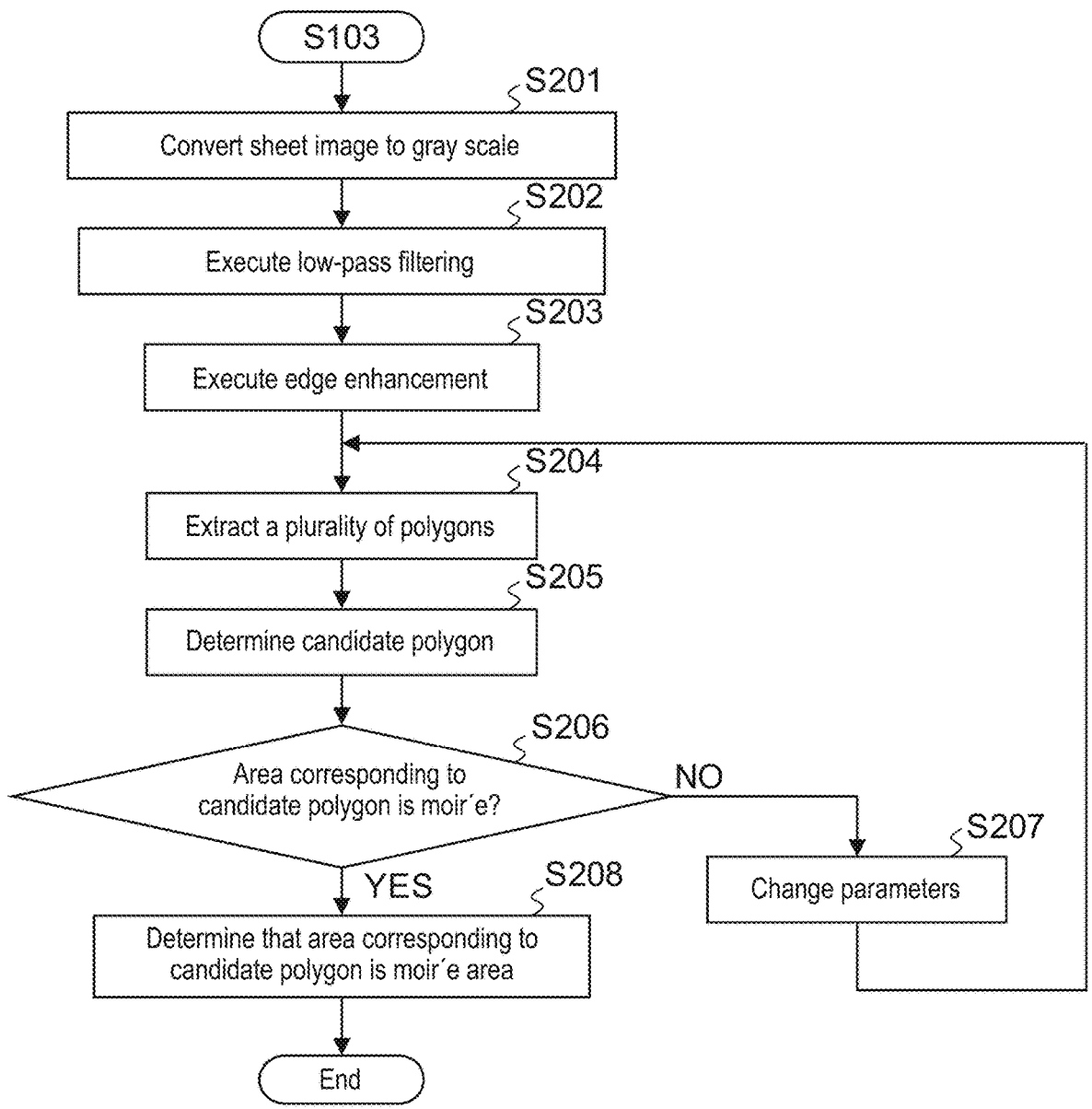
FIG. 10 is a flow chart illustrating a more detailed process than the process in S103.

FIG. 10 is a flow chart illustrating a more detailed process than the process in S103.

First, the image converting unit 231 converts the sheet image, which is the color image acquired by the sheet image data acquisition unit 22, from a color image into a gray scale image (S201). Next, the low-pass filter unit 232 executes a low-pass filtering process on the sheet image converted to a gray scale image by the process in S201 in order to remove a small edge included in the sheet image (S202). The sheet image becomes an image with the noise removed through the low-pass filtering process in S202.

Next, the edge enhancing unit 233 executes an edge enhancing process for enhancing an edge on the sheet image low-pass filtered by the process in S202 (S203). In an embodiment, the edge enhancing unit 233 includes an edge enhancement filter. Next, the polygon extracting unit 234 executes a contour process on the sheet image the edge of which was enhanced by the process in S203 to extract a plurality of polygons included in the sheet image (S204).

Next, the candidate polygon determining unit 235 determines a candidate polygon to be a moiré area candidate from the plurality of polygons extracted by the process in S204 (S205). The candidate polygon determining unit 235 determines that the polygon having a polygon area ratio closest to a reference area ratio with respect to an area of the sheet image from among square polygons extracted by the process in S204 is a candidate polygon. The reference area ratio is an area ratio of the area of the non-fixing area 101c with respect to the area of the sheet image 100 in a state where the non-fixing area 101c is not being stretched.

Next, the moiré area judging unit 236 determines whether an area corresponding to the candidate polygon determined by the process in S205 is the moiré area (S206). When an aspect ratio of the candidate polygon determined by the process in S205 is within a prescribed threshold, the moiré area judging unit 236 determines that an image corresponding to the candidate polygon determined by the process in S205 is the moiré area. Furthermore, when the aspect ratio of the candidate polygon determined by the process in S205 is outside the prescribed threshold, the moiré area judging unit 236 determines that an image corresponding to the candidate polygon determined by the process in S205 is not the moiré area.

In an embodiment, a threshold range can use an aspect ratio of the white area W102 arranged between the moiré area of the sheet 100 and the black area B102, in a state where the non-fixing area 101c is not being stretched, as a center value. By using the aspect ratio of the white area W102 as the center value of the threshold range, the moiré area judging unit 236 is able to determine that an area of a square polygon corresponding to the aspect ratio of the white area W102 is the moiré area.

When the moiré area judging unit 236 determines that the area corresponding to the candidate polygon is not the moiré area, the parameter changing unit 237 changes the parameters used in the processes in S205 and S206 (S207), and the process returns to S204. The parameter changing unit 237 changes at least one out of a threshold area ratio used by the process in S205 and the threshold range used by the process in S206.

When the moiré area judging unit 236 determines that an area corresponding to the candidate polygon is the moiré area, the moiré area determining unit 238 determines that the area corresponding to the candidate polygon is the moiré area (S208).

Figure 11:
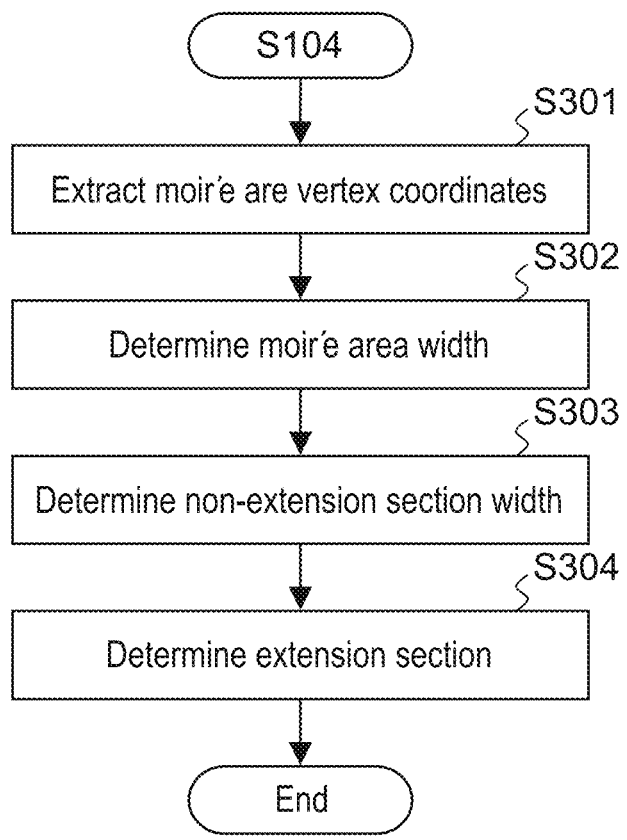
FIG. 11 is a flow chart illustrating a more detailed process than the process in S104.
Figure 12A:
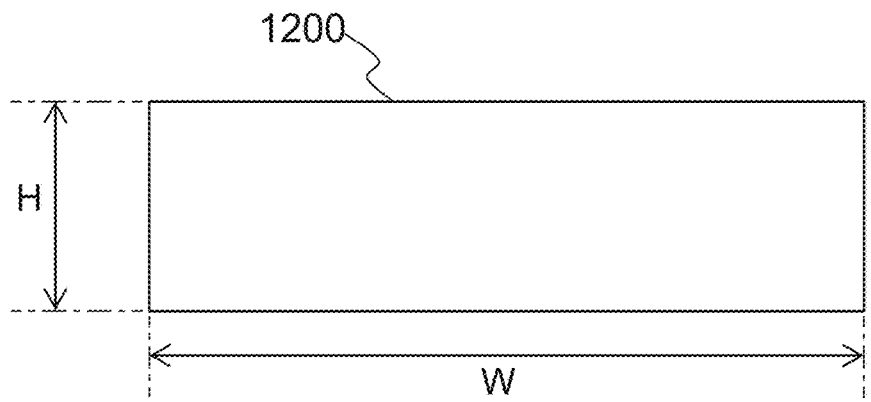
FIG. 12A is a first drawing for describing the process in S104.
Figure 12B:
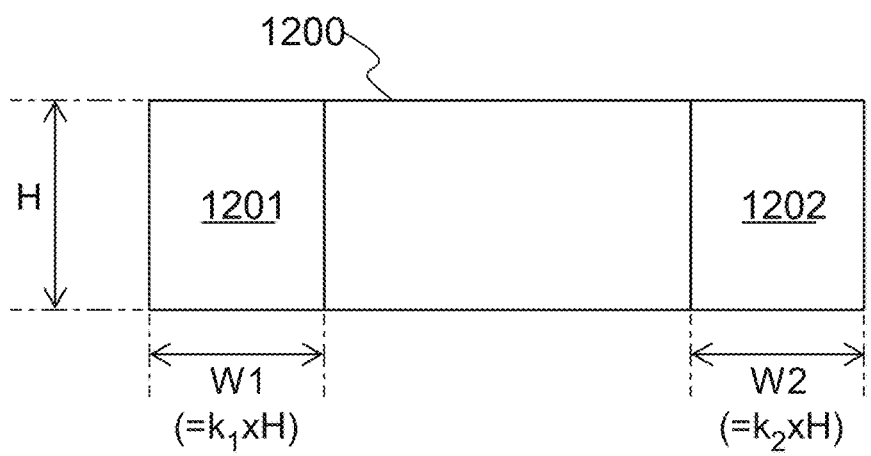
FIG. 12B is a second drawing for describing the process in S104.
Figure 12C:
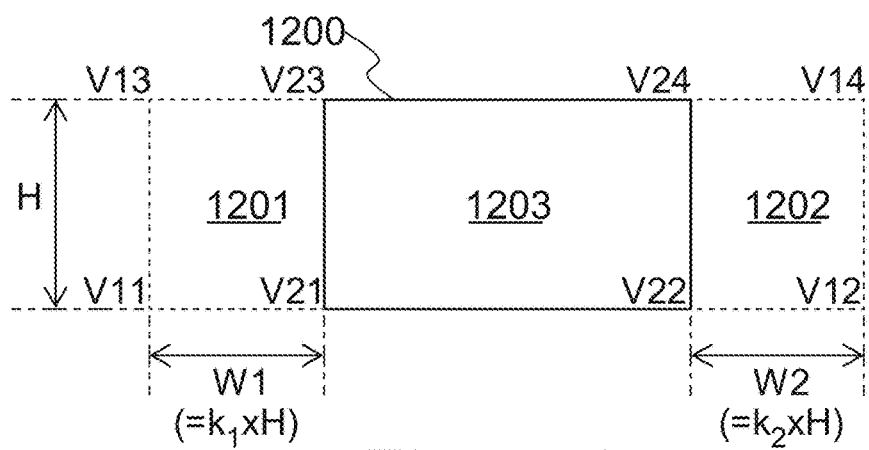
FIG. 12C is a third drawing for describing the process in S104.

FIG. 11 is a flow chart illustrating a more detailed process than the process in S104, and FIG. 12 is a drawing for describing the process in S104. FIG. 12A is a first drawing for describing the process in S104, FIG. 12B is a second drawing for describing the process in S104, and FIG. 12C is a third drawing for describing the process in S104.

First, the vertex extracting unit 241 extracts coordinates of four vertices of a square moiré area 1200 extracted by the process in S103 (S301).

Next, the moiré area height determining unit 242 determines a length of a long side detected from the coordinates of the four vertices of the moiré area 1200 extracted by the process in S301 to be a width W of the moiré area 1200 and a length of a short side of the area to be a height H of the moiré area 1200 (S302). As illustrated in FIG. 12A, the height H of the moiré area 1200 is shorter than the width W of the moiré area 1200.

Next, the fixing area width determining unit 243 determines a width of a fixing area from the height H of the moiré area 1200 determined by the process in S302 and the reference aspect ratio 151 stored in the terminal storage unit 15 (S303). The fixing area width determining unit 243 determines a width W1 ($=k_1 \times H$) of a first fixing area 1201 from the height H of the moiré area 1200 and a first reference aspect ratio $k_1$ ($=W1/H$). The fixing area width determining unit 243 also determines a width W2 ($=k_2 \times H$) of a second fixing area 1202 from the height H of the moiré area 1200 and a second reference aspect ratio $k_2$ ($=W2/H$).

Furthermore, the non-fixing area determining unit 244 determines a non-fixing area from the coordinates of the four vertices of the moiré area 1200 extracted by the process in S301 and the width of the fixing area determined by the process in S303 (S304). The non-fixing area determining unit 244 determines two vertices V21 and V22 of a non-fixing area 1203 from two vertices V11 and V12 arranged on both ends of the long side of the moiré area 1200 and the width W1 of the first fixing area 1201 and the width W2 of the second fixing area 1202. The non-fixing area determining unit 244 also determines two vertices V23 and V24 of the non-fixing area 1203 from two vertices V13 and V14 arranged on both ends of the long side of the moiré area 1200 and the width W1 of the first fixing area 1201 and the width W2 of the second fixing area 1202.

[Configuration and Function of the Image Area Extracting System According to a Second Embodiment]

Figure 13:
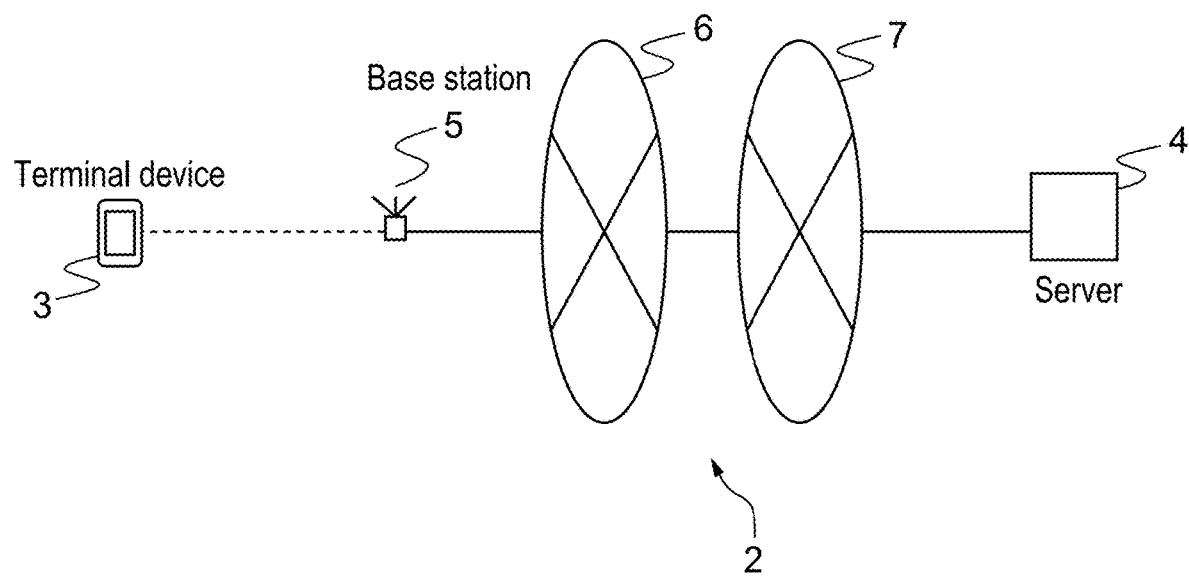
FIG. 13 is a drawing illustrating the image area extracting system according to a second embodiment.

FIG. 13 is a drawing illustrating the image area extracting system according to a second embodiment.

In an image area extracting system 2, switches not illustrated in the figures are connected to one another through a communication network 6, which is a wide area communication network. The switches connect wireless communication networks covering certain regions to the communication network 6. A base station 5 is provided in a wireless communication network to manage a wireless zone covering a region. The base station 5 is connected to a switch through a wireless network controller not illustrated in the figures to which the base station 5 belongs. Furthermore, a terminal device 3 in the region is connected to a switch through the base station 5 when the terminal device 3 communicates with a server 4, and the like, and is also connected to the communication network 6.

Furthermore, the communication network 6 is connected to the Internet 7 through a gateway not illustrated in the figures by a wired LAN, such as Ethernet (Registered Trademark) and the like. The server 4 is also connected to the Internet 7.

[Configuration and Function of the Terminal Device According to the Second Embodiment]

Figure 14:
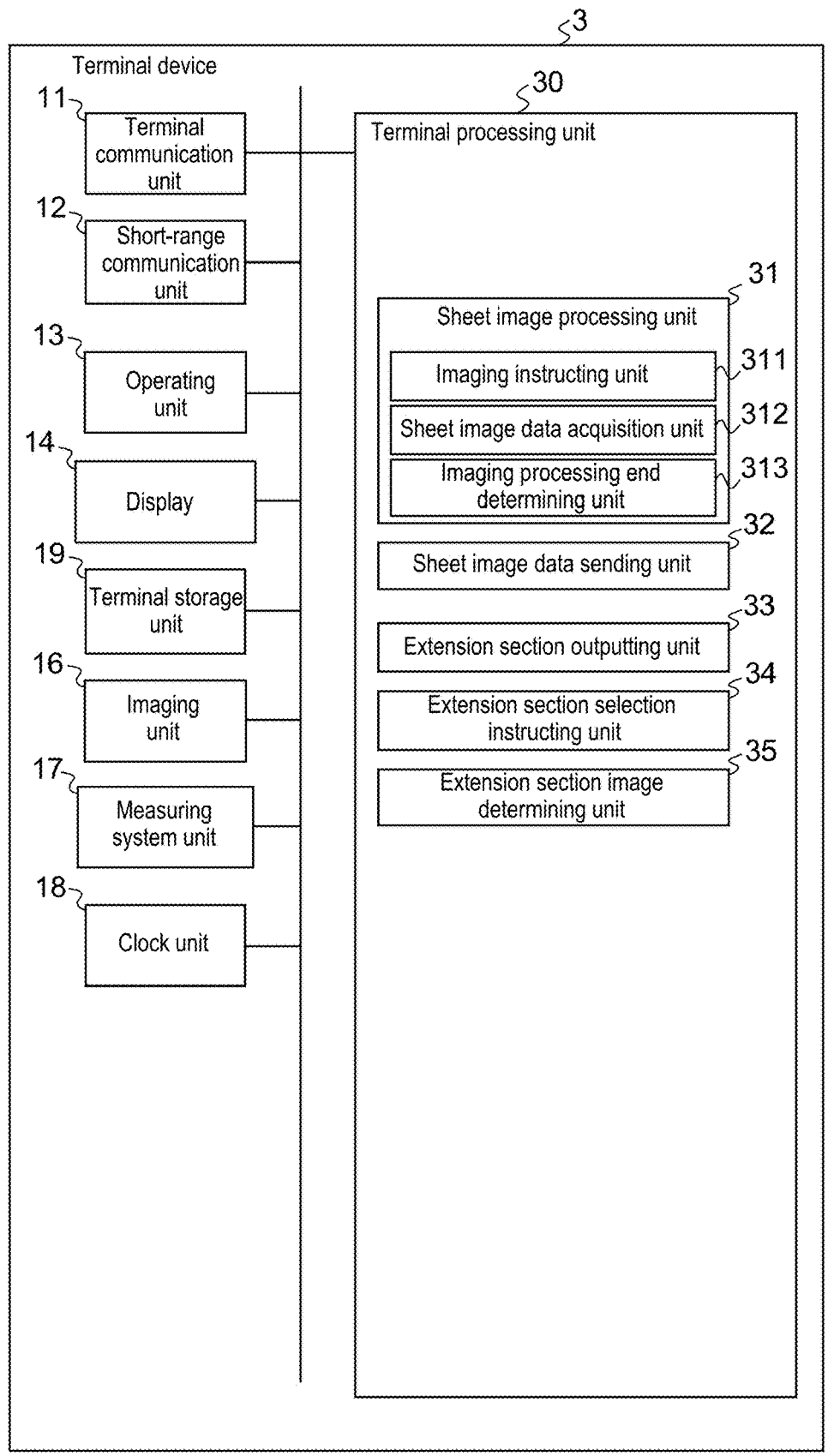
FIG. 14 is a drawing illustrating a schematic configuration of the terminal device illustrated in FIG. 13.

FIG. 14 is a drawing illustrating a schematic configuration diagram of a terminal device 3.

Just like the image area extracting device 1, the terminal device 3 is, for example, a multifunction mobile phone (so-called "smart phone"), which makes it possible to connect to a wireless communication network, conduct short-range wireless communication, and execute a prescribed application program, and the like. The terminal device 3 differs from the image area extracting device 1 in that it has a terminal storage unit 19 and a terminal processing unit 30 in place of the terminal storage unit 15 and the terminal processing unit 20. Because the configurations and functions of the configuring elements of the terminal device 3 other than the terminal storage unit 19 and the terminal processing unit 30 are the same as the configurations and functions of the configuring elements of the image area extracting device 1 having the same reference numerals, descriptions of these configuring elements are omitted. Apart from the fact that the terminal storage unit 19 does not store the reference aspect ratio 151, it has the same configuration and function as the terminal storage unit 15, and is thus not described in detail here.

The terminal processing unit 30 has one or a plurality of processors and peripheral circuits thereof. The terminal processing unit 30 comprehensively controls all of the operations of the terminal device 3, and is, for example a CPU. The terminal processing unit 30 controls the operations of the terminal communication unit 11 and the short-range communication unit 12, and the like, so that various processes of the terminal device 3 are executed in an appropriate order based on a program stored in the terminal storage unit 19, the operations of the operating unit 13, and the like. The terminal processing unit 30 executes processing based on a program (driver program, operating system program, application program, and the like) stored in the terminal storage unit 19. Furthermore, the terminal processing unit 30 can execute a plurality of programs (application programs, and the like) in parallel.

The terminal processing unit 30 has a sheet image processing unit 31, a sheet image data sending unit 32, a non-fixing area output unit 33, a non-fixing area selection instructing unit 34, and a non-fixing area image determining unit 35. The sheet image processing unit 31 has an imaging instructing unit 311, a sheet image data acquisition unit 312, and a imaging processing end determining unit 313. Each of these units in the terminal processing unit 30 are functional modules loaded by a program executed on a processor in the terminal processing unit 30. Or, each of these units in the terminal processing unit 30 may be mounted on the terminal device 3 as an independent integrated circuit, a microprocessor, or as firmware.

[Configuration and Function of the Server According to the Second Embodiment]

Figure 15:
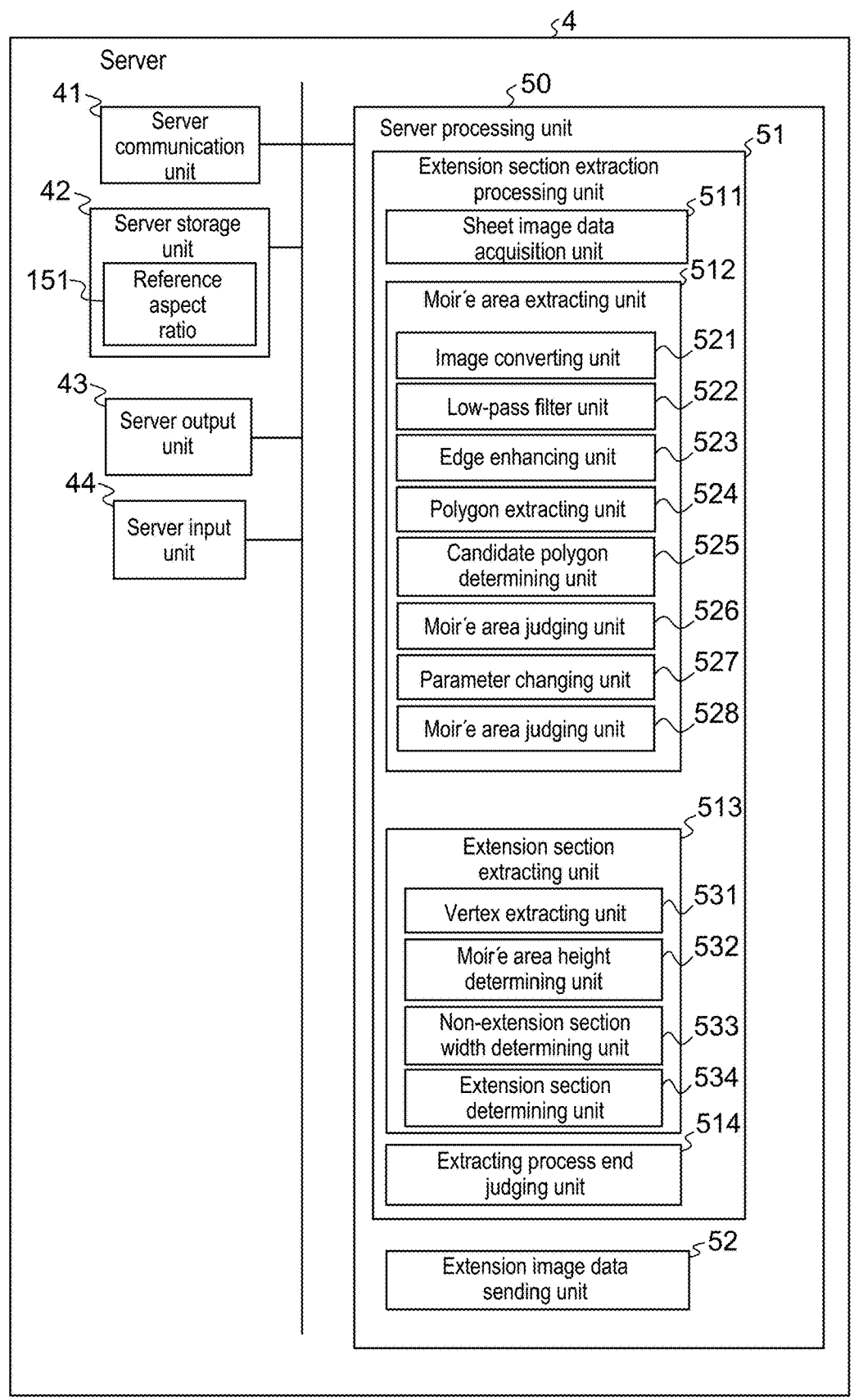
FIG. 15 is a drawing illustrating a schematic configuration of the server illustrated in FIG. 13.

FIG. 15 is a drawing illustrating the schematic structure of the server 4 according to the second embodiment.

The server 4 is an information processing device capable of a variety of types of information processing, and is provided with a server communication unit 41, a server storage unit 42, a server output unit 43, a server input unit 44, and a server processing unit 50.

The server communication unit 41 has a wired communication interface circuit, such as Ethernet (Registered Trademark), and the like. The server communication unit 41 communicates with the terminal device 3, and the like, through a LAN not illustrated in the figures and the Internet 7. The server communication unit 41 also supplies data received from the terminal device 3, and the like, to the server processing unit 50. Moreover, the server communication unit 41 sends data supplied by the terminal processing unit 50 to the terminal device 3, and the like.

The server storage unit 42 has at least one out of, for example, a semiconductor memory, a magnetic disk device, and an optical disk device. The server storage unit 42 stores data, and the like, such as a driver program, an operating system program, and an application program used in processing by the server processing unit 50. For example, the server storage unit 42 stores a communication device driver program, and the like, for controlling the server communication unit 41. The server storage unit 42 also stores a connection control program, and the like, according to a communication format, such as TCP/IP, and the like, as an operating system program. The server storage unit 42 also stores a data processing program for sending and receiving a variety of data, an image area extracting process program, and the like, as application programs. A computer program can be installed on the server storage unit 42 using a known startup program from a computer readable portable recording medium, such as, for example, CD-ROM, DVD-ROM, and the like.

The server storage unit 42 also stores information and data used in image area extracting processing, as well as, data derived by image area extracting processing. Additionally, the server storage unit 42 may temporarily store temporary data relating to a prescribed process. In an embodiment, the server storage unit 42 stores the reference aspect ratio 151 used in image area extracting processing, just like the terminal storage unit 15. The reference aspect ratio 151 includes a first reference aspect ratio $k_1$ (=W1/H) derived by dividing a width W1 of the first fixing area 101*a* by a height H of the first fixing area 101*a*, and a second reference aspect ratio $k_2$ (=W2/H) derived by dividing a width W2 of the second fixing area 101*b* by a height H of the second fixing area 101*b*.

The server output unit 43 can be any device capable of outputting a video, a static image, and the like, and is, for example, a touch panel type display device, as liquid crystal display, or an organic EL display, and the like. The server output unit 43 displays a static image corresponding to video and static image data based on video data supplied by the server processing unit 50.

The server input unit 44 can be any device capable of making an input to the server 4, and is, for example, an input device, a keyboard, and the like. A user can use the device to input text, numbers, and the like. The server input unit 44 receives an instruction from the user, generates a signal corresponding to the received instruction, and outputs the signal to the server processing unit 50.

The server processing unit 50 has one or a plurality of processors and peripheral circuits thereof. The server processing unit 50 comprehensively controls all of the operations of the server 4, and is, for example a CPU. The server processing unit 50 controls the operations of the server communication unit 41, and the like, so that various processes of the server 4 are executed in an appropriate order based on a program, and the like, stored in the terminal storage unit 42. The server processing unit 50 executes processing based on a program (driver program, operating system program, application program, and the like) stored in the server storage unit 42. Furthermore, the server processing unit 50 can execute a plurality of programs (application programs, and the like) in parallel.

The server processing unit 50 has a non-fixing area extraction processing device 51, and an extensible image data sending unit 52. The non-fixing area extraction processing device 51 has a sheet image data acquisition unit 511, a moiré area extracting unit 512, and a non-fixing area extracting unit 513. The moiré area extracting unit 512 has an image converting unit 521, a low-pass filter unit 522, an edge enhancing unit 523, a polygon extracting unit 524, a candidate polygon determining unit 525, a moiré area judging unit 526, a parameter changing unit 527, and a moiré area determining unit 528. The non-fixing area extracting unit 513 has a vertex extracting unit 531, a moiré area height determining unit 532, a fixing area width determining unit 533, and a non-fixing area determining unit 534. Each of these units in the server processing unit 50 are functional modules loaded by a program executed on a processor in the server processing unit 50. Or, each of these units in the server processing unit 50 may be mounted on the server 4 as an independent integrated circuit, a microprocessor, or as firmware.

Figure 16:
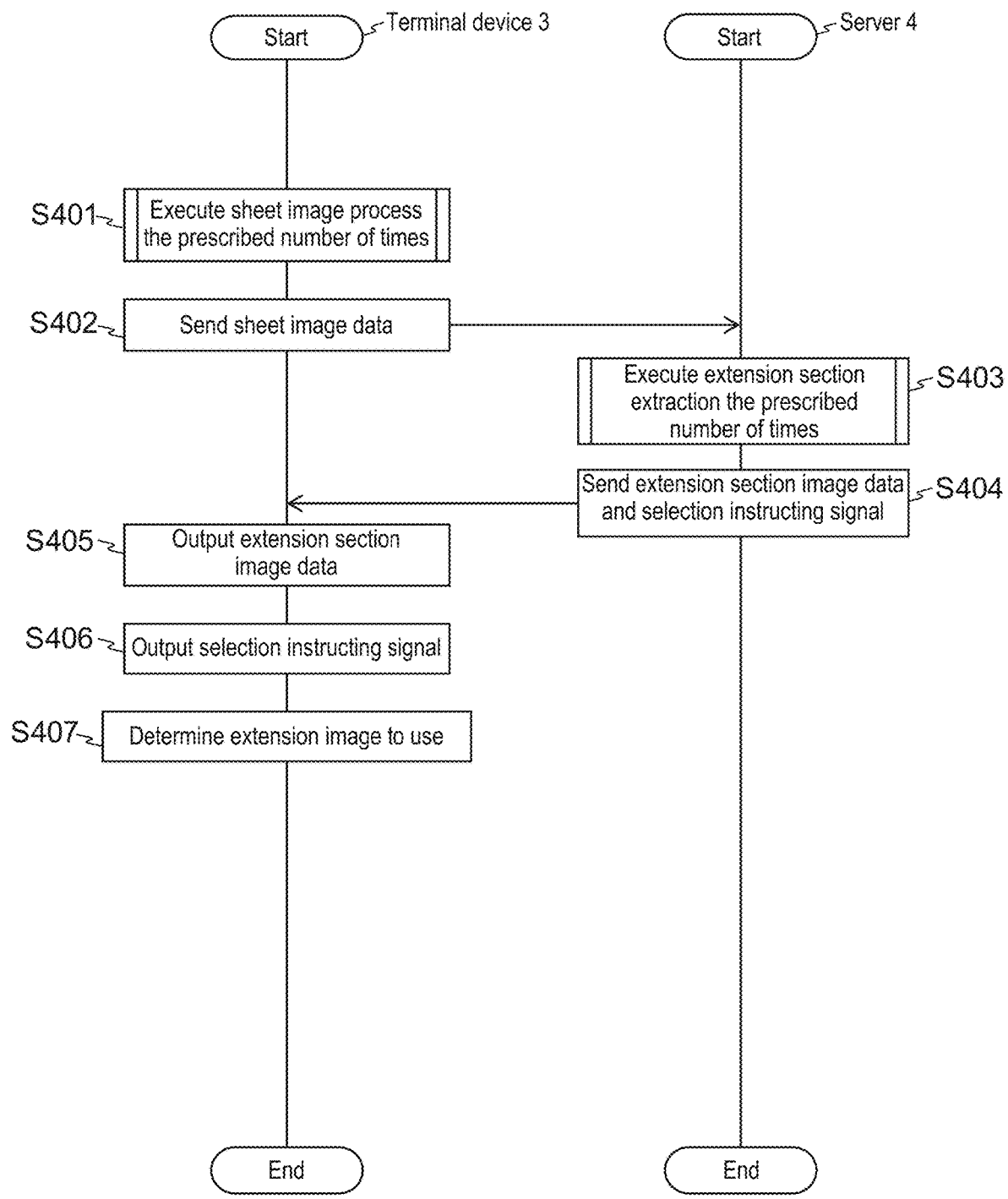
FIG. 16 is a flow chart illustrating an image area extracting process by the image area extracting system illustrated in FIG. 13.

[Image Area Extracting Processing by the Image Area Extracting System According to the Second]Embodiment FIG. 16 is a flow chart illustrating an image area extracting process by the image area extracting system 2.

First, the sheet image processing unit 31 executes image processing for imaging a sheet a prescribed number of times (S401). Next, the sheet image data sending unit 32 sends sheet image data showing a prescribed number of sheet images including the sheet imaged by the process in S401 to the server 4 (S402).

Next, the non-fixing area extraction processing device 51 executes a non-fixing area extraction process a prescribed number of times to extract a non-fixing area from a sheet included in a prescribed number of sheet images corresponding to the received sheet image data (S403). Next, the extensible image data sending unit 52 sends non-fixing area image data showing a non-fixing area image including the non-fixing area extracted by the process in S403 to the terminal device 3 (S404).

Next, the non-fixing area output unit 33 outputs to the display 14 a prescribed number of extensible images included in the received non-fixing area image data along with display position information showing a display image displayed on the display 14 (S405). The display 14 displays a prescribed number of non-fixing area images in a display position corresponding to the display position information.

Next, the non-fixing area selection instructing unit 34 outputs a selection instructing signal showing which of the prescribed number of non-fixing area images to select (S406). In an embodiment, the imaging instruction includes the character string "Please select 1 image." Furthermore, the non-fixing area image determining unit 35 determines that the non-fixing area image selected by the operator not illustrated in the figures is the non-fixing area image to be used (S407).

Figure 17A:
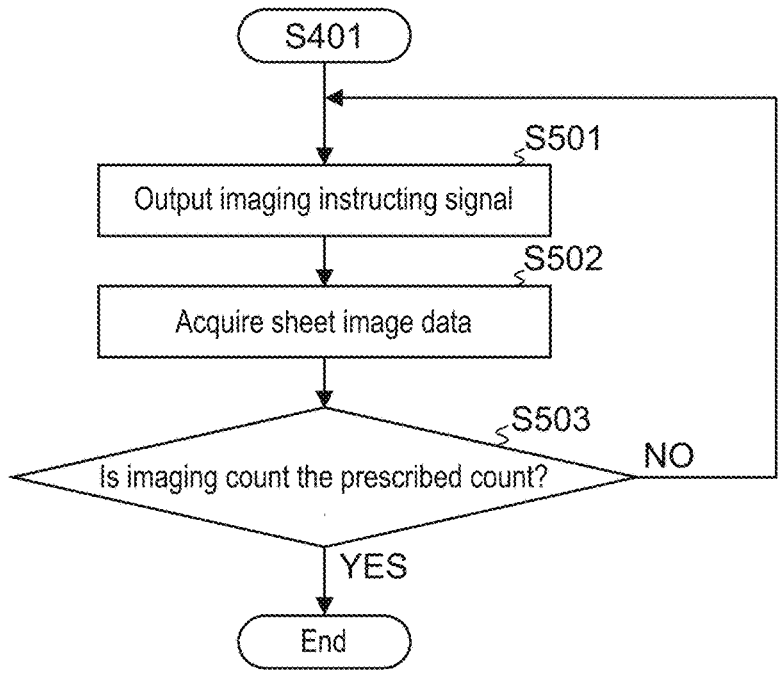
FIG. 17A is a flow chart illustrating a more detailed process than the process in S401.
Figure 17B:
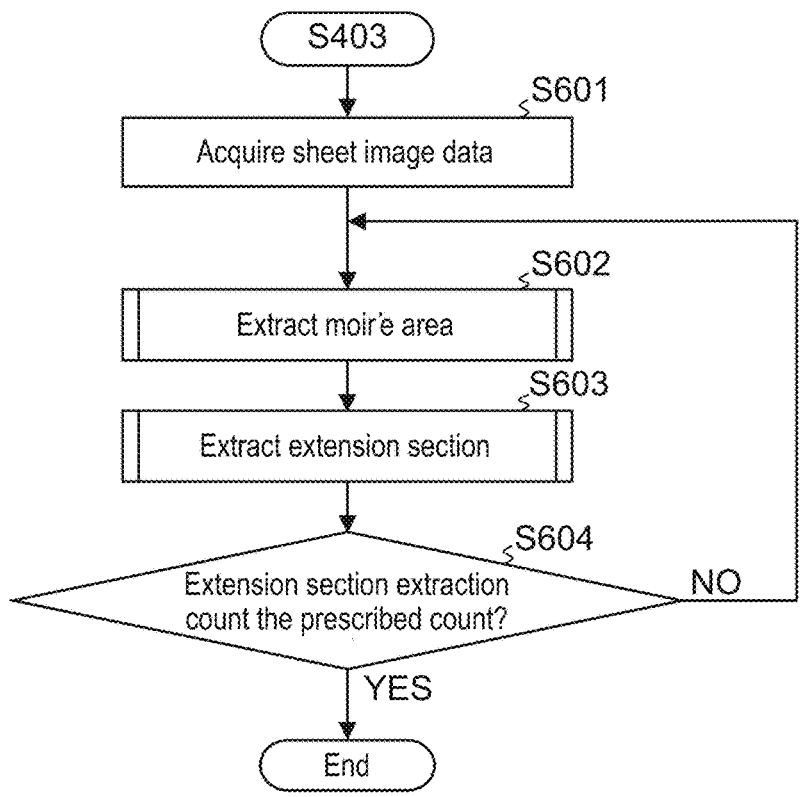
FIG. 17B is a flow chart illustrating a more detailed process than the process in S403.

FIG. 17(A) is a flow chart illustrating a more detailed process than the process in S401, and FIG. 17(B) is a flow chart illustrating a more detailed process than in S403.

In S401, first, the imaging instructing unit 311 outputs an imaging instructing signal to the display 14 showing imaging instructions for instructing imaging of a sheet to an operator not illustrated in the figures based on a startup process for an image area extracting program by the operator not illustrated in the figures (S501). In an embodiment, the imaging instruction includes the character string "Please image the sheet." When an imaging instructing signal is input, the display 14 displays a character string including an imaging instruction corresponding to the imaging instructing signal.

Next, the sheet image data acquisition unit 312 acquires sheet image data showing a sheet image including the sheet through the imaging unit 16 based on a sheet imaging operation by the operator not illustrated in the figures using the terminal device 3 (S502). The sheet image corresponding to the sheet image data is a color image captured so as to include a moiré area where a moiré is created by overlapping a first pattern P101 and a second pattern P102.

Next, the imaging processing end determining unit 313 determines whether an imaging count has reached a prescribed count (S503). If the imaging processing end determining unit 313 determines that the imaging count has not reached the prescribed count (S503—NO), the process returns to S501. Subsequently, the processing in S501 through S503 is repeated until the imaging processing end determining unit 313 determines that the imaging count has reached the prescribed count (S503—YES). If the imaging processing end determining unit 313 determines that the imaging count has reached the prescribed count (S503—YES), the process ends.

In S403, first, the sheet image data acquisition unit 511 acquires the received sheet image data (S601). The sheet image data corresponds to a prescribed number of sheet images.

Next, the moiré area extracting unit 512 extracts the moiré area where a moiré is created by overlapping the first pattern P101 and the second pattern P102 from one of a prescribed number of sheet images corresponding to the sheet image data acquired by the process in S601 (S602). The more detailed process in S602 using the image converting unit 521 through the moiré area determining unit 528 is the same as the process in S103, and thus descriptions thereof are omitted here.

Next, the non-fixing area extracting unit 513 extracts a non-fixing area in which a sticky section has not been arranged based on a size of a fixing area where a sticky section has been arranged from the moiré area extracted by the process in S602 (S603). The more detailed process in S603 using the vertex extracting unit 531 through the non-fixing area determining unit 534 is the same as the process in S104, and thus descriptions thereof are omitted here.

Next, an extracting processing end determining unit 514 determines whether a non-fixing image extracting process has been executed a prescribed number of times (S604). If the extracting processing end determining unit 514 determines that the non-fixing image extracting process has not been executed a prescribed number of times (S604—NO), the process returns to S602. Subsequently, the processing in S602 through S604 is repeated until the imaging processing end determining unit 514 determines that the non-fixing image extracting process has been executed a prescribed number of times (S604—YES). If the extracting processing end determining unit 514 determines that the non-fixing image extracting process has been executed a prescribed number of times (S604—YES), the process ends.

[Operation Effect of the Image Area Extracting Method According to an Embodiment]

Figure 18:
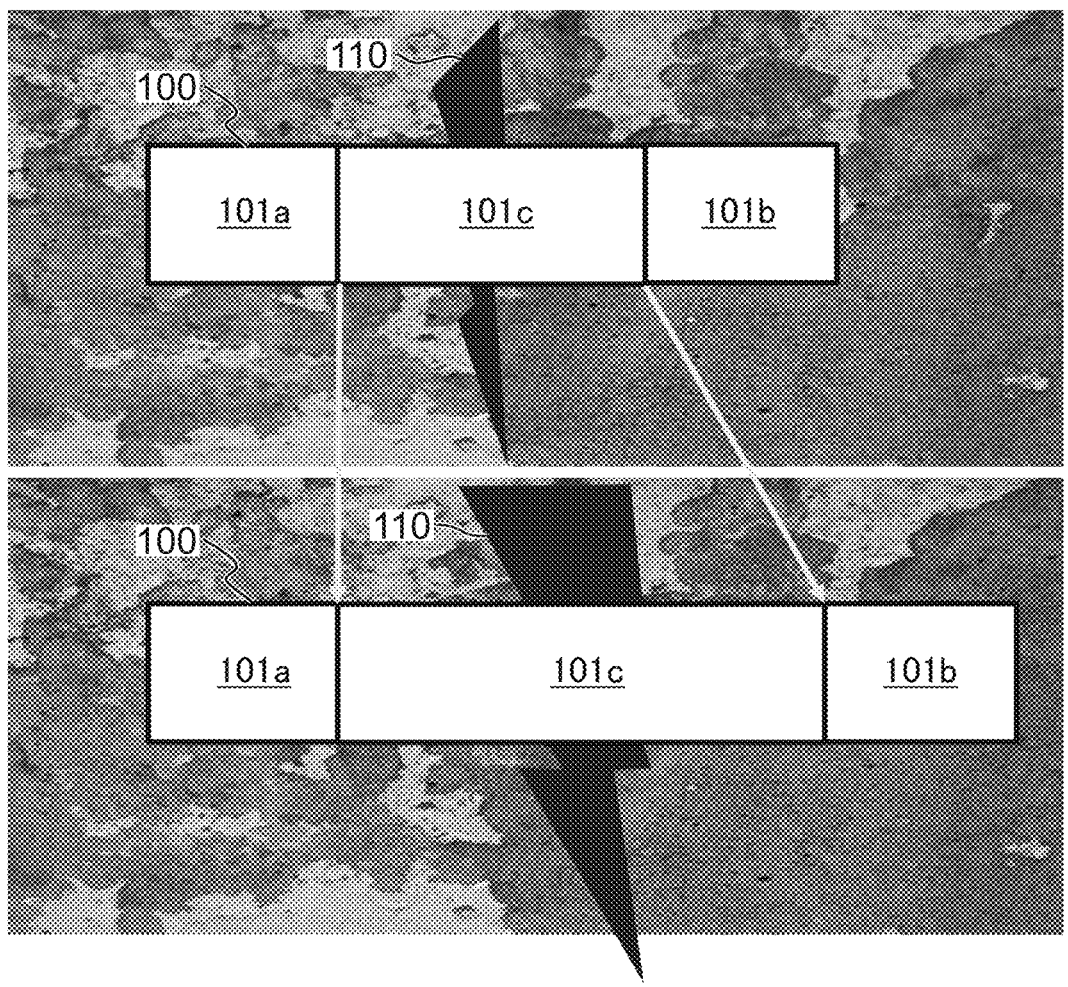
FIG. 18 is a drawing illustrating a sheet affixed to a crack.

As illustrated in FIG. 18, the non-fixing area 101c of the sheet 100 affixed to a crack 110 extends as a crack width of the crack 110 becomes larger. Meanwhile, neither the first fixing area 101a nor the second fixing area 101b change significantly regardless of the size of the crack width of the crack 110. With the image area extracting method according to an embodiment, the non-fixing area 101c can be extracted based on a simple calculation using the fact that the sizes of the first fixing area 101a and the second fixing area 101b do not change in conjunction with changes in the size of the crack width of the crack 110.

[Modified Example of the Image Area Extracting Method According to an Embodiment]

While a non-fixing area is arranged between the separately arranged first fixing area and second fixing area in the sheet used in the current disclosure, the sheet used in the image area extracting method according to an embodiment is not intended to be limited to this type of form.

Figure 19A:
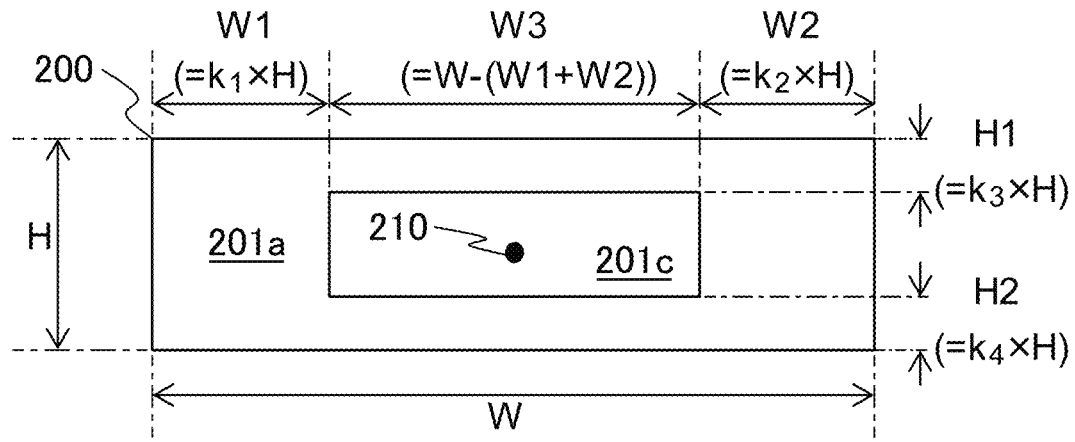
FIG. 19A is a drawing illustrating the sheet according to a first modified embodiment.
Figure 19B:
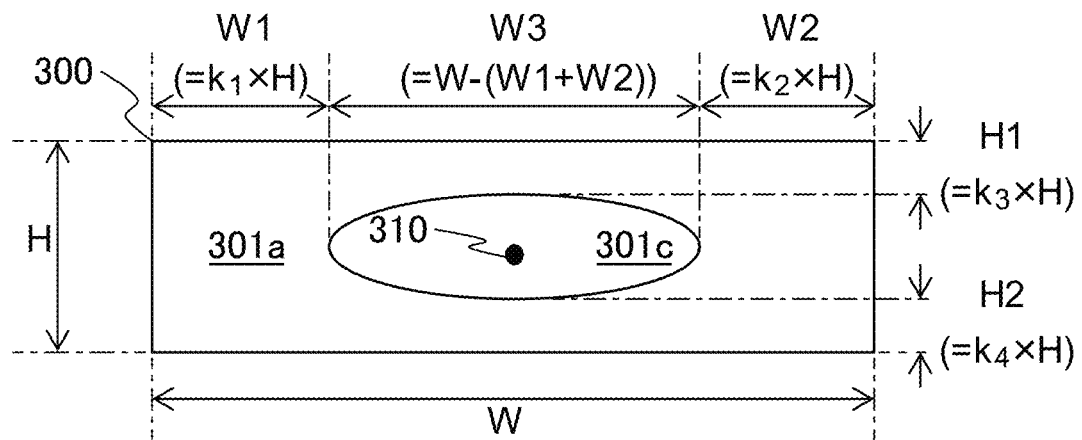
FIG. 19B is a drawing illustrating the sheet according to a second modified embodiment.

FIG. 19A is a diagram illustrating the sheet according to a first modified embodiment, and FIG. 19B is a diagram illustrating the sheet according to a second modified embodiment. The sheet illustrated in FIG. 19A has the same configuration as the sheet illustrated in FIG. 2B, and the sheet illustrated in FIG. 19B has the same configuration as the sheet illustrated in FIG. 2C.

Even if a crack 210 increases in a sheet 200, if a height H of the sheet 200 is substantially the same, a width W3 of a non-fixing area 201c is determined based on a width W of the sheet 200, the first reference aspect ratio $k_1$, and the second reference aspect ratio $k_2$. The first reference aspect ratio $k_1$ is a ratio (W1/H) of a length W1, between a left end of the sheet 200 and a left end of the non-fixing area 201c in a state where the non-fixing area 201c is not being stretched or contracted, with respect to the height H of the sheet 200. The second reference aspect ratio $k_2$ is a ratio (W2/H) of a length W2, between a right end of the sheet 200 and a right end of the non-fixing area 201c in a state where the non-fixing area 201c is not being stretched or contracted, with respect to the height H of the sheet 200.

Even if a crack 310 increases in a sheet 300, if a height H of the sheet 300 is substantially the same, a width W3 of a non-fixing area 301c is determined based on a width W of the sheet 300, the first reference aspect ratio $k_1$, and the second reference aspect ratio $k_2$. The first reference aspect ratio $k_1$ is a ratio (W1/H) of a length W1, between a left end of the sheet 300 and a left end of the non-fixing area 301c in a state where the non-fixing area 301c is not being stretched or contracted, with respect to the height H of the sheet 300. The second reference aspect ratio $k_2$ is a ratio (W2/H) of a length W2, between a right end of the sheet 300 and a right end of the non-fixing area 301c in a state where the non-fixing area 301c is not being stretched or contracted, with respect to the height H of the sheet 300.

Figure 20A:
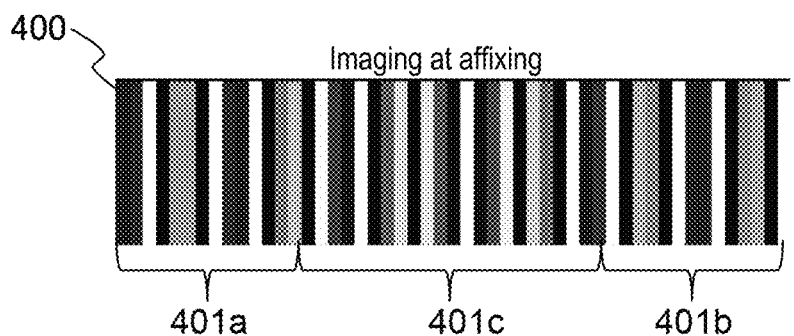
FIGS. 20A-20D are figures for describing an image area extracting method using frequency analysis compared to the image area extracting method according to an embodiment, where
Figure 20B:
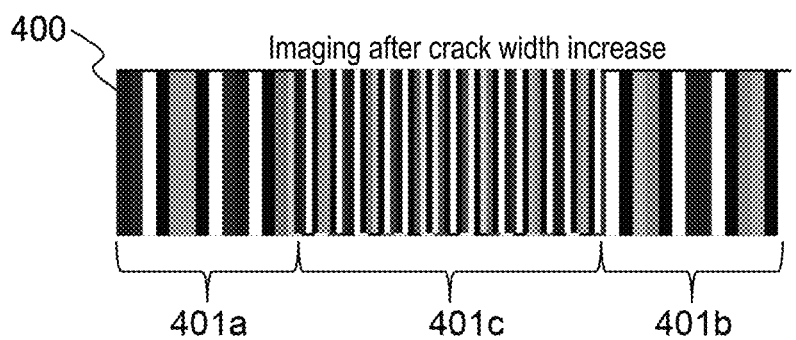
Figure 20C:
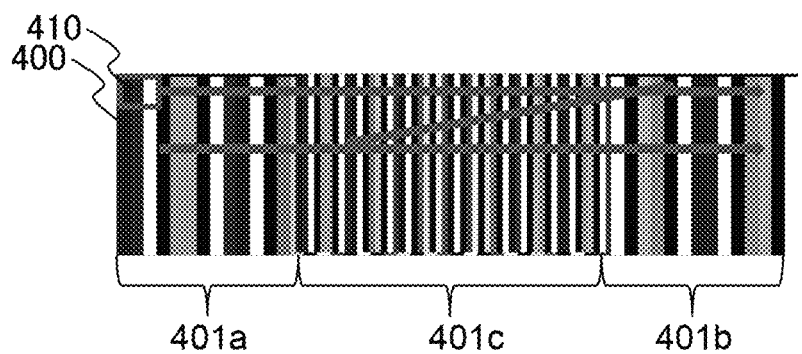
Figure 20D:
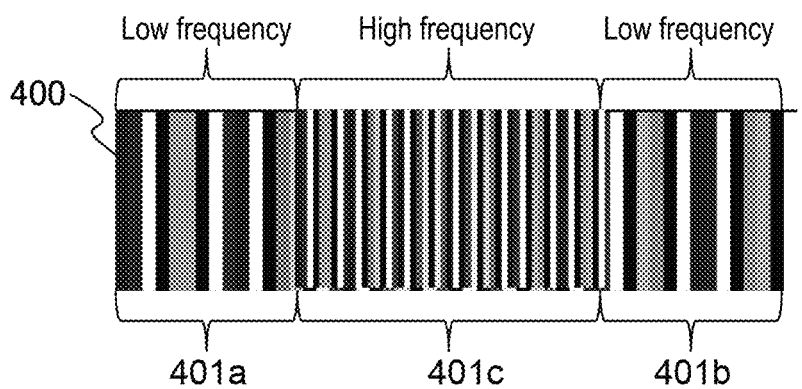

[Comparison of the Image Area Extracting Method According to the Embodiments and an Image Area]Extracting Method Using Frequency Analysis FIGS. 20A-20D are figures describing a comparison of the image area extracting method according to the embodiments and an image area extracting method using frequency analysis (also referred to as a frequency analysis method in the present disclosure). FIG. 20A illustrates an example of a moiré area imaged when a sheet was affixed to a wall in which a crack had occurred, and FIG. 20B illustrates an example of the moiré area imaged after a crack width had increased. FIG. 20C illustrates an example of scanning in the frequency analysis method, and FIG. 20D illustrates an example of a determination of a non-fixing area in the frequency analysis method.

As illustrated in FIG. 20A, spatial frequencies for a first fixing area 401a, a second fixing area 401b, and a non-fixing area 401c are the same when a sheet 400 is affixed where a crack has occurred. Meanwhile, as illustrated in FIG. 20B, after the crack width has increased, a spatial frequency of a moiré occurring in the non-fixing area 401c is higher than the spatial frequencies of moirés occurring in the first fixing area 401a and the second fixing area 401b.

As illustrated in FIG. 20C, the frequency analysis method calculates a spatial frequency in a minute area 410, and then, extracts a non-fixing area by judging whether the minute area 410 belongs to a high-frequency area or a low-frequency area while scanning sequentially across an entire area of the sheet 400.

As illustrated in FIG. 20D, the frequency analysis method determines that areas judged to be low-frequency areas are the first fixing area 401a and the second fixing area 401b and not the non-fixing area 401c, and then, extracts the area judged to be a high-frequency area as the non-fixing area 401c.

Figure 21A:
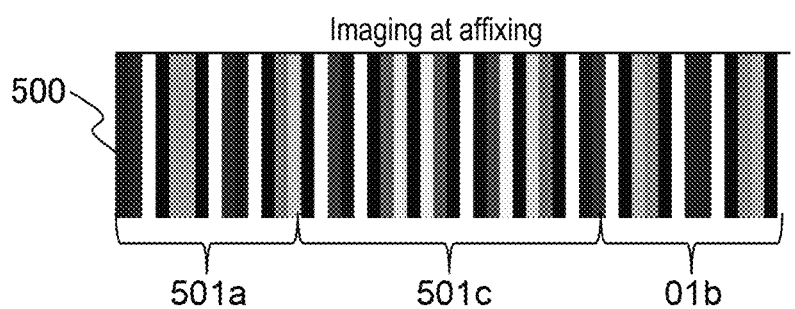
FIGS. 21A-21E are figures illustrating a comparison between the frequency analysis method and the image area extracting method according to an embodiment, where
Figure 21B:
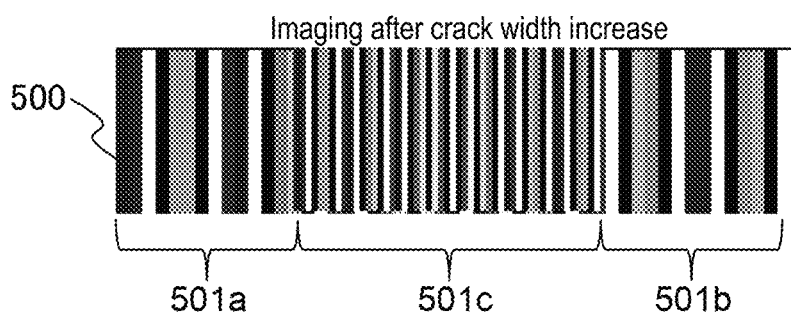
Figure 21C:
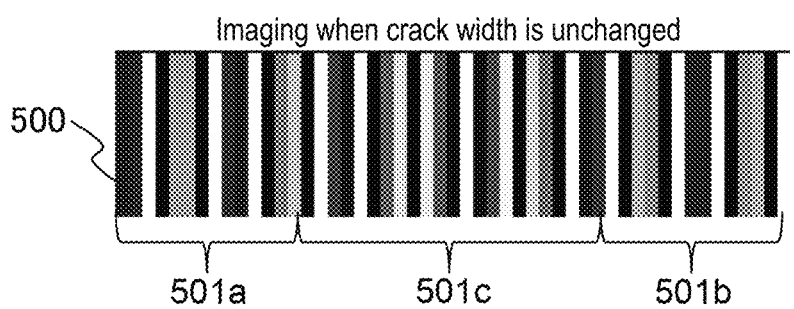
Figure 21D:
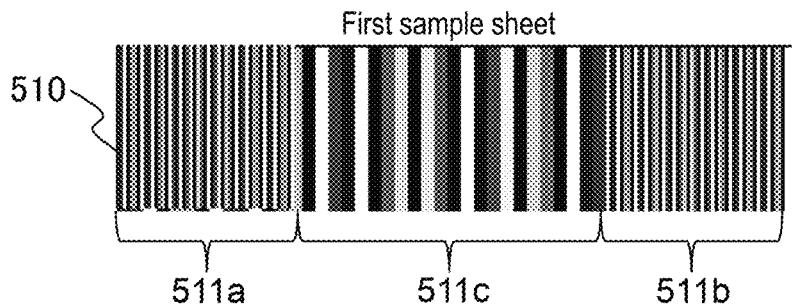
Figure 21E:
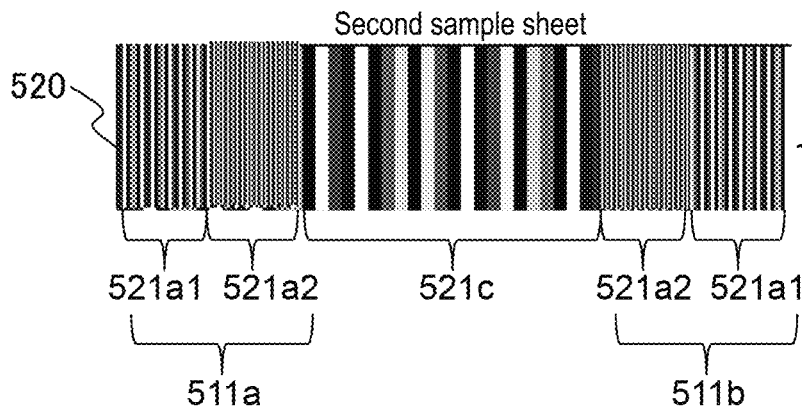

FIGS. 21A-21E are figures illustrating a comparison between the image area extracting method according to an embodiment and the frequency analysis method. FIG. 21A illustrates an example of a moiré area imaged when a sheet was affixed to a wall in which a crack had occurred, FIG. 21B illustrates an example of the moiré area imaged after a crack width had increased, and FIG. 21C illustrates an example of the moiré area imaged when the crack width was unchanged. FIG. 21D illustrates a first sample sheet with respect to which the image area extracting method according to an embodiment can judge a non-fixing area and the frequency analysis method cannot judge a non-fixing area. FIG. 21E illustrates a second sample sheet with respect to which the image area extracting method according to an embodiment can judge a non-fixing area and the frequency analysis method cannot judge a non-fixing area.

As illustrated in FIGS. 21A and 21C, spatial frequencies for a first fixing area 501a, a second fixing area 501b, and a non-fixing area 501c are the same when a sheet 500 is affixed where a crack has occurred, and the non-fixing area 501c is not extended or contracted. Meanwhile, as illustrated in FIG. 21B, after a crack width has increased, a spatial frequency of a moiré occurring in the non-fixing area 501c is higher than the spatial frequencies of moirés occurring in the first fixing area 501a and the second fixing area 501b.

A first sample sheet 510 is formed so that a moiré spatial frequency occurring in a first end part 511a positioned on a left end and a second end part 511b positioned on a right end is higher than a spatial frequency of a center part 511c positioned between the first end part 511a and the second end part 511b.

The image area extracting method according to an embodiment extracts the center part 511c based on the aspect ratios of the first end part 511a and the second end part 511b, respectively, and is thus able to extract the center part 511c from the first sample sheet 510. On the other hand, the frequency analysis method determines that an area where a moiré spatial frequency is smaller than the moiré spatial frequencies occurring in the first end part 511a and the second end part 511b to be the center part 511c, and is thus unable to extract the center part 511c from the first sample sheet 510. Note that there is a modified example of the frequency analysis method that extracts an area where moiré spatial frequencies occurring in the first end part 511a and the second end part 511b are the same and an occurring spatial frequency is different than the first end part 511a and the second end part 511b as the center part 511c. The modified example of the frequency analysis method extracts an area where an occurring spatial frequency is different than the first end part 511a and the second end part 511b as the center part 511c, and is thus able to extract the center part 511c from the first sample sheet 510.

A second sample sheet 520 is formed so that a moiré spatial frequency occurring in a first end part 521a positioned on a left end and a second end part 521b positioned on a right end is higher than a spatial frequency of a center part 521c positioned between the first end part 521a and the second end part 521b. The first end part 521a has a 1-1 end part 521a1 positioned on a right end where an occurring moiré spatial frequency is higher than a spatial frequency of the center part 521c, and a 1-2 end part 521a2, where an occurring moiré spatial frequency is an even higher spatial frequency, located inward from the 1-1 end part 521a1. The second end part 521b has a 2-1 end part 521b1 positioned on a right end where an occurring moiré spatial frequency is higher than a spatial frequency of the center part 521c, and a 2-2 end part 521b2, where an occurring moiré spatial frequency is an even higher spatial frequency, located inward from the 2-1 end part 521b1.

The image area extracting method according to an embodiment extracts the center part 521c based on the aspect ratios of the first end part 521a and the second end part 521b, respectively, and is thus able to extract the center part 521c from the second sample sheet 520. On the other hand, the frequency analysis method determines that an area where a moiré spatial frequency is smaller than the moiré spatial frequencies occurring in the first end part 511a and the second end part 511b to be the center part 511c, and is thus unable to extract the center part 511c from the first sample sheet 510. Furthermore, the modified example of the frequency analysis method extracts the 1-2 end part 521a2, the 2-2 end part 521b2, and the center part 511c, which have different frequencies than the 1-1 end part 521a1 and the 2-1 end part 521b1 as a center part, and is thus unable to extract just the center part 511c.

Table 1 summarizes center part extraction results using the first sample sheet 510 and the second sample sheet 520. The image area extracting method according to an embodiment is able to accurately extract center parts from both the first sample sheet 510 and the second sample sheet 520. The modified example of the frequency analysis method is able to extract a center part in the first sample sheet 510, but is unable to accurately extract a center part in the second sample sheet 520.

TABLE 1

| | Image area extracting method according to an embodiment | Frequency analysis method |
|---|---|---|
| First sample sheet | ○ | Δ |
| Second sample sheet | ○ | x |

FIGURE REFERENCE NUMBERS

1 Image area extracting device
2 Image area extracting system
3 Terminal device
4 Server (image area extracting device)
20 Terminal processing unit
21, 311 Imaging instruction units
22, 511 Sheet image data acquisition units
23, 512 Moiré area extracting units
24, 513 Non-fixing area extracting units
25, 33 Non-fixing area output units
26, 313 Image processing end determining units
27, 34 Non-fixing area selection instructing units
28, 35 Non-fixing area image determining units Exemplary Embodiments Item 1. An image area extracting method for extracting an image area from an image in which a sheet has been imaged provided with a first layer section having a first pattern including a plurality of drawn lines extending in a first direction, a second layer section overlapping the first layer section and including a plurality of drawn lines extending in a second direction that is different from the first direction, and a low adhesion section where adhesive force is lower than that of an adhesive section and an adhesion section arranged on an adhesive surface opposite a surface facing the first layer section and the second layer section, the method comprising:

acquiring sheet image data showing a sheet image including a sheet imaged so as to include a moiré area where a moiré is created by overlaying the first pattern and the second pattern, extracting the moiré area from the sheet image, extracting a non-fixing area where the low adhesive section is arranged based on a size of a fixing area where the adhesion section is arrange, and outputting non-fixing area image data showing a non-fixing area image including the non-fixing area.

Item 2. The image area extracting method according to Item 1, wherein the fixing area includes a first fixing area arranged on the adhesive surface and a second fixing area arranged on the adhesive surface separated from the first fixing area, and the extracting of the non-fixing area from the moiré area includes extracting an area positioned between the first fixing area and the second fixing area as the non-fixing area.

Item 3. The image area extracting method according to Item 1 or 2, wherein a planar shape of the fixed area is substantially rectangular, and the extracting of the non-fixing area from the moiré area includes extracting the non-fixing area based on an aspect ratio of the fixing area.

Item 4. A non-transitory computer readable medium containing an image area extracting program for extracting an image area from an image in which a sheet has been imaged provided with a first layer section having a first pattern including a plurality of drawn lines extending in a first direction, a second layer section overlapping the first layer section and including a plurality of drawn lines extending in a second direction that is different from the first direction, and a low adhesion section where adhesive force is lower than that of an adhesive section and an adhesion section arranged on an adhesive surface opposite a surface facing the first layer section and the second layer section, the image area extracting program when executed by a computing device causing a computing device to perform the steps of:

acquiring sheet image data showing a sheet image including a sheet imaged so as to include a moiré area where a moiré is created by overlaying the first pattern and the second pattern, extracting the moiré area from the sheet image, extracting a non-fixing area where the low adhesive section is arranged based on a size of a fixing area where the adhesion section is arrange, and outputting non-fixing area image data showing a non-fixing area image including the non-fixing area.

Item 5. The non-transitory computer readable medium according to Item 4, wherein the fixing area includes a first fixing area arranged on the adhesive surface and a second fixing area arranged on the adhesive surface separated from the first fixing area, and the extracting of the non-fixing area from the moiré area includes extracting an area positioned between the first fixing area and the second fixing area as the non-fixing area.

Item 6. The non-transitory computer readable medium according to Item 4 or 5, wherein a planar shape of the fixed area is substantially rectangular, and the extracting of the non-fixing area from the moiré area includes extracting the non-fixing area based on an aspect ratio of the fixing area.

Item 7. An image area extracting device for extracting an image area from an image in which a sheet has been imaged provided with a first layer section having a first pattern including a plurality of drawn lines extending in a first direction, a second layer section overlapping the first layer section and including a plurality of drawn lines extending in a second direction that is different from the first direction, and a low adhesion section where adhesive force is lower than that of an adhesion section and an adhesive section arranged on an adhesive surface opposite a surface facing the first layer section and the second layer section, the device comprises:

a sheet image data acquiring unit for acquiring sheet image data showing a sheet image including a sheet imaged so as to include a moiré area where by a moiré is created by overlapping the first pattern and the second pattern, a moiré area extracting unit for extracting the moiré area from the sheet image, an extensible area extracting unit for extracting a non-fixing area where the low adhesion area is arranged based on a size of a fixing area arranged by the adhesive section, and a fixing area outputting unit for outputting non-fixing area image data showing a non-fixing area image
including the non-fixing area.

Item 8. The image area extracting device according to Item 7, wherein the fixing area includes a first fixing area arranged on the adhesive surface and a second fixing area arranged on the adhesive surface separated from the first fixing area, and the extracting of the non-fixing area from the moiré area includes extracting an area positioned between the first fixing area and the second fixing area as the non-fixing area.

Item 9. The image area extracting device according to Item 7 or 8, wherein a planar shape of the fixed area is substantially rectangular, and the extracting of the non-fixing area from the moiré area includes extracting the non-fixing area based on an aspect ratio of the fixing area.

Item 10. An image area extracting system for extracting an image area from an image in which a sheet has been imaged provided with a first layer section having a first pattern including a plurality of drawn lines extending in a first direction, a second layer section overlapping the first layer section and including a plurality of drawn lines extending in a second direction that is different from the first direction, and a low adhesion section where adhesive force is lower than that of an adhesion section and an adhesive section arranged on an adhesive surface opposite a surface facing the first layer section and the second layer section, the system comprises:

a sheet image data acquiring unit for acquiring sheet image data showing a sheet image including a sheet imaged so as to include a moiré area where a moiré is created by overlapping the first pattern and the second pattern, a moiré area extracting unit for extracting the moiré area from the sheet image, an extensible area extracting unit for extracting a non-fixing area where the low adhesion area is arranged based on a size of a fixing area arranged by the adhesive section, and a fixing area outputting unit for outputting non-fixing area image data showing a non-fixing area image
including the non-fixing area.

Item 11. The image area extracting system according to Item 10, wherein the fixing area includes a first fixing area arranged on the adhesive surface and a second fixing area arranged on the adhesive surface separated from the first fixing area, and the extracting of the non-fixing area from the moiré area includes extracting an area positioned between the first fixing area and the second fixing area as the non-fixing area.

Item 12. The image area extracting system according to Item 10 or 11, wherein a planar shape of the fixed area is substantially rectangular, and the extracting of the non-fixing area from the moiré area includes extracting the non-fixing area based on an aspect ratio of the fixing area.

What is claimed is:

1. An image area extracting method for extracting an image area from an image in which a sheet has been imaged provided with a first layer section having a first pattern including a plurality of drawn lines extending in a first direction, a second layer section overlapping the first layer section, the second layer section having a second pattern including a plurality of drawn lines extending in a second direction that is different from the first direction, and a low adhesion section where adhesive force is lower than that of an adhesive section and an adhesion section arranged on an adhesive surface opposite a surface facing the first layer section and the second layer section, wherein a computer executes processing comprising:

acquiring sheet image data showing a sheet image including a sheet imaged so as to include a moiré area where a moiré is created by overlaying the first pattern and the second pattern, extracting the moiré area from the sheet image, extracting a non-fixing area where the low adhesive section is arranged based on a size of a fixing area where the adhesion section is arranged, and outputting non-fixing area image data showing a non-fixing area image including the non-fixing area.

2. The image area extracting method according to claim 1, wherein the fixing area includes a first fixing area arranged on the adhesive surface and a second fixing area arranged on the adhesive surface separated from the first fixing area, and the extracting of the non-fixing area from the moiré area includes extracting an area positioned between the first fixing area and the second fixing area as the non-fixing area.

3. The image area extracting method according to claim 1, wherein a planar shape of the fixed area is substantially rectangular, and the extracting of the non-fixing area from the moiré area includes extracting the non-fixing area based on an aspect ratio of the fixing area.

4. A non-transitory computer readable medium containing an image area extracting program for extracting an image area from an image in which a sheet has been imaged provided with a first layer section having a first pattern including a plurality of drawn lines extending in a first direction, a second layer section overlapping the first layer section, the second layer section having a second pattern including a plurality of drawn lines extending in a second direction that is different from the first direction, and a low adhesion section where adhesive force is lower than that of an adhesive section and an adhesion section arranged on an adhesive surface opposite a surface facing the first layer section and the second layer section, the image area extracting program when executed by a computing device causing a computing device to perform the steps of:

acquiring sheet image data showing a sheet image including a sheet imaged so as to include a moiré area where a moiré is created by overlaying the first pattern and the second pattern, extracting the moiré area from the sheet image, extracting a non-fixing area where the low adhesive section is arranged based on a size of a fixing area where the adhesion section is arranged, and outputting non-fixing area image data showing a non-fixing area image including the non-fixing area.

5. The non-transitory computer readable medium according to claim 4, wherein the fixing area includes a first fixing area arranged on the adhesive surface and a second fixing area arranged on the adhesive surface separated from the first fixing area, and the extracting of the non-fixing area from the moiré area includes extracting an area positioned between the first fixing area and the second fixing area as the non-fixing area.

6. The non-transitory computer readable medium according to claim 4, wherein a planar shape of the fixed area is substantially rectangular, and the extracting of the non-fixing area from the moiré area includes extracting the non-fixing area based on an aspect ratio of the fixing area.

7. An image area extracting device for extracting an image area from an image in which a sheet has been imaged provided with a first layer section having a first pattern including a plurality of drawn lines extending in a first direction, a second layer section overlapping the first layer section, the second layer section having a second pattern including a plurality of drawn lines extending in a second direction that is different from the first direction, and a low adhesion section where adhesive force is lower than that of an adhesion section and an adhesive section arranged on an adhesive surface opposite a surface facing the first layer section and the second layer section, the device comprises:

a sheet image data acquiring unit for acquiring sheet image data showing a sheet image including a sheet imaged so as to include a moiré area where by a moiré is created by overlapping the first pattern and the second pattern, a moiré area extracting unit for extracting the moiré area from the sheet image, an extensible area extracting unit for extracting a non-fixing area where the low adhesion area is arranged based on a size of a fixing area arranged by the adhesive section, and a fixing area outputting unit for outputting non-fixing area image data showing a non-fixing area image including the non-fixing area.

8. The image area extracting device according to claim 7, wherein the fixing area includes a first fixing area arranged on the adhesive surface and a second fixing area arranged on the adhesive surface separated from the first fixing area, and the extracting of the non-fixing area from the moiré area includes extracting an area positioned between the first fixing area and the second fixing area as the non-fixing area.

9. The image area extracting device according to claim 7, wherein a planar shape of the fixed area is substantially rectangular, and the extracting of the non-fixing area from the moiré area includes extracting the non-fixing area based on an aspect ratio of the fixing area.

10. An image area extracting system for extracting an image area from an image in which a sheet has been imaged provided with a first layer section having a first pattern including a plurality of drawn lines extending in a first direction, a second layer section overlapping the first layer section, the second layer section having a second pattern including a plurality of drawn lines extending in a second direction that is different from the first direction, and a low adhesion section where adhesive force is lower than that of an adhesion section and an adhesive section arranged on an adhesive surface opposite a surface facing the first layer section and the second layer section, the system comprises:

a sheet image data acquiring unit for acquiring sheet image data showing a sheet image including a sheet imaged so as to include a moiré area where a moiré is created by overlapping the first pattern and the second pattern, a moiré area extracting unit for extracting the moiré area from the sheet image, an extensible area extracting unit for extracting a non-fixing area where the low adhesion area is arranged based on a size of a fixing area arranged by the adhesive section, and a fixing area outputting unit for outputting non-fixing area image data showing a non-fixing area image including the non-fixing area.

11. The image area extracting system according to claim 10, wherein the fixing area includes a first fixing area arranged on the adhesive surface and a second fixing area arranged on the adhesive surface separated from the first fixing area, and the extracting of the non-fixing area from the moiré area includes extracting an area positioned between the first fixing area and the second fixing area as the non-fixing area.

12. The image area extracting system according to claim 10, wherein a planar shape of the fixed area is substantially rectangular, and the extracting of the non-fixing area from the moiré area includes extracting the non-fixing area based on an aspect ratio of the fixing area.

* * * * *